(12) United States Patent
Zeng et al.

(10) Patent No.: US 12,392,351 B2
(45) Date of Patent: Aug. 19, 2025

(54) INFLATABLE PRODUCT AND BUILT-IN AIR PUMP ASSEMBLY

(71) Applicant: BESTWAY INFLATABLES & MATERIAL CORP., Shanghai (CN)

(72) Inventors: Xianglin Zeng, Shanghai (CN); Qingshui Song, Shanghai (CN); Wanbin Qiu, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 18/230,321

(22) Filed: Aug. 4, 2023

(65) Prior Publication Data
US 2024/0309880 A1  Sep. 19, 2024

(30) Foreign Application Priority Data
Mar. 14, 2023 (CN) .......................... 202320491328.2

(51) Int. Cl.
*F04D 27/00* (2006.01)
*F04D 25/06* (2006.01)
*F04D 25/08* (2006.01)

(52) U.S. Cl.
CPC ......... *F04D 27/003* (2013.01); *F04D 25/068* (2013.01); *F04D 25/08* (2013.01)

(58) Field of Classification Search
CPC ........ F04D 27/00; F04D 27/003; F04D 25/06; F04D 25/068; F04D 25/08; F04D 25/084; F04D 25/10; F04D 29/48–503; A47C 27/082
See application file for complete search history.

(56) References Cited

U.S. PATENT DOCUMENTS

| | | | |
|---|---|---|---|
| 9,157,433 B2 * | 10/2015 | Wang | F04B 49/022 |
| 11,339,792 B2 | 5/2022 | Li | |
| 2009/0089935 A1 * | 4/2009 | Wang | H01H 35/245 |
| | | | 200/82 R |
| 2014/0366957 A1 | 12/2014 | Wang et al. | |

(Continued)

OTHER PUBLICATIONS

Extended European Search Report dated Feb. 27, 2024 (Feb. 27, 2024), 7 pages, issued on related European patent application 23197131.8 by the European Patent Office.

*Primary Examiner* — Woody A Lee, Jr.
*Assistant Examiner* — Joshua R Beebe
(74) *Attorney, Agent, or Firm* — DICKINSON WRIGHT PLLC

(57) ABSTRACT

An air pump assembly includes; a main air pump in a chamber; and an air pressure adjustment assembly including: a housing in the chamber; a flexible board defining a first chamber on a first side of the board and a second chamber on a second side of the board, the first chamber in fluid communication with an inflatable chamber of the inflatable product, and the second chamber in fluid communication with an exterior of the inflatable product. The adjustment assembly further includes: an adjusting device including a positioning component and an elastic member on the second side of the board, the elastic member disposed between the positioning component and the board, and a position of one end of the elastic member defined by the positioning component; and a driving device coupled to the positioning component to thereby drive the positioning component to move relative to the housing.

18 Claims, 29 Drawing Sheets

(56) References Cited

U.S. PATENT DOCUMENTS

| | | | | |
|---|---|---|---|---|
| 2015/0252809 A1* | 9/2015 | Tsai | ................ | A47C 27/083 417/44.2 |
| 2018/0110342 A1* | 4/2018 | Moss | ................ | A47C 27/082 |

* cited by examiner

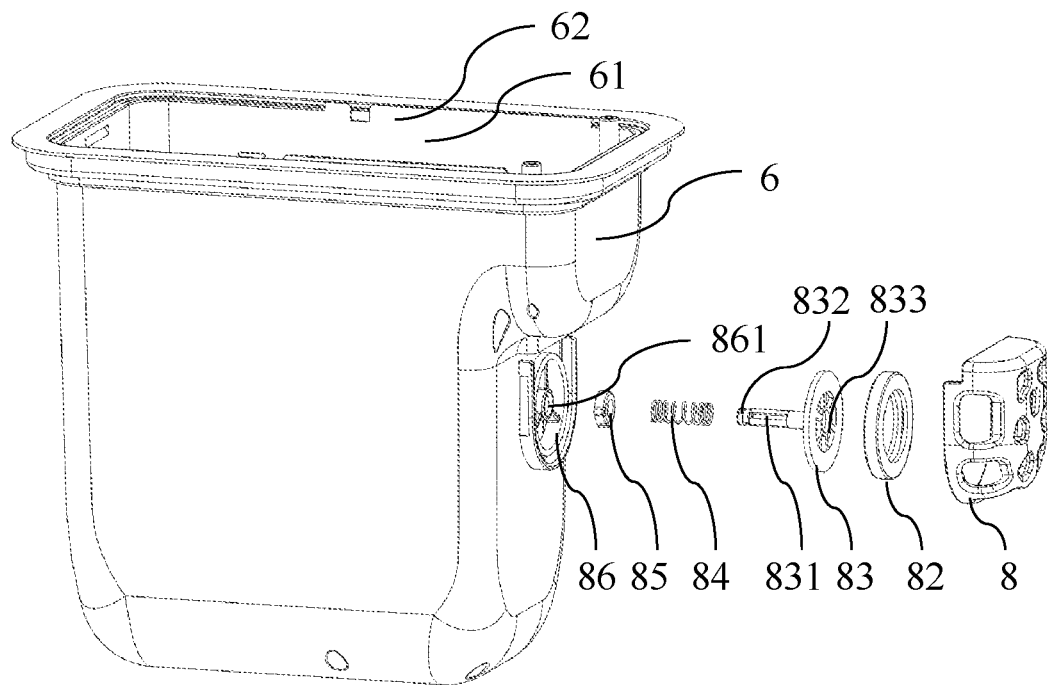
FIG. 8
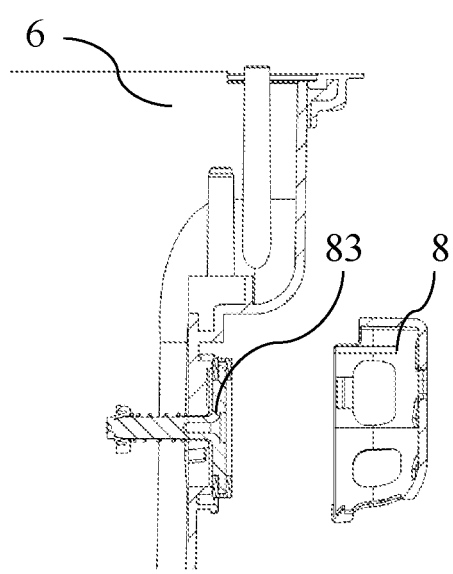 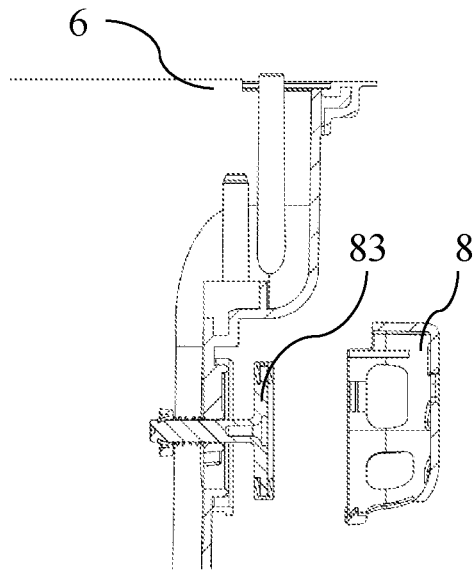
FIG. 9a  FIG. 9b

INFLATABLE PRODUCT AND BUILT-IN AIR PUMP ASSEMBLY

CROSS-REFERENCE TO RELATED APPLICATION

This application claims priority from Chinese Application CN202320491328.2, filed Mar. 14, 2023 in China, the disclosure of which is incorporated herein by reference in its entirety.

BACKGROUND

1. Field

Example embodiments relate to inflatable products, and, more particularly, to a built-in air pump assembly and an inflatable product comprising the built-in air pump assembly.

2. Description of Related Art

Inflation or deflation of inflatable products is usually achieved by means of an air pump. For ease of use, some inflatable products are equipped with built-in air pump assemblies, with main body portions of the built-in air pump assemblies located in inflatable chambers of the inflatable products, and panels of the built-in air pump assemblies assembled on walls of the inflatable chambers. Typically, a user may operate a panel of an air pump, so that the air pump sucks air from the outside and inflates the inflatable chamber, or the air pump sucks air from the inflatable chamber and expels it to the outside.

The material of an inflatable product may become stretched over a period of time, causing air pressure in the inflatable chamber of the inflatable product to drop. Taking an inflatable mattress as an example, the mattress may be suitable for use upon initial inflation, but after a period of time, due to a stretching of the material of the mattress, the air pressure may drop and the mattress may become too soft.

SUMMARY

Example embodiments may address at least the above problems and/or disadvantages and other disadvantages not described above. Also, example embodiments are not required to overcome the disadvantages described above, and may not overcome any of the problems described above.

One or more example embodiments described herein may provide an inflatable product and a built-in air pump assembly in which it is convenient for a user to adjust inflation pressure of the inflatable product, such that internal air pressure of the inflatable product.

According to an aspect of an example embodiment, a built-in air pump assembly comprises: a casing defining an accommodating chamber; a main air pump disposed in the accommodating chamber; an air pressure adjustment assembly comprising: a housing disposed in the accommodating chamber; a flexible board defining a first chamber within the housing on a first side of the flexible board and a second chamber within the housing on a second side of the flexible board, wherein the first chamber is in fluid communication with an inflatable chamber, and the second chamber is in fluid communication with an exterior of the inflatable chamber; and an adjusting device comprising: a positioning component disposed on the second side of the flexible board, and an elastic member disposed between the positioning component and the flexible board, wherein one end of the elastic member is defined by the positioning component; and a driving device coupled to the positioning component and configured to drive the positioning component to move relative to the housing to thereby adjust the distance between the positioning component and the flexible board.

The built-in air pump assembly may further comprise: a panel; wherein the driving device comprises: a knob coupled to the positioning component and axially moveable with respect to the panel such that axial movement of the knob triggers a start switch configured to initiate one of inflation and deflation of the inflatable chamber; and a reset spring disposed arranged between the knob and the panel and configured to axially reset the knob.

The built-in air pump assembly may further comprise: a panel; wherein the driving device comprises: a knob disposed on the panel and coupled to the positioning component; a button axially moveable with respect to the knob such that axial movement of the button triggers trigger a start switch for initiating one of inflation and deflation of the inflatable chamber; and a reset spring disposed between the button and the panel and configured to axially reset the button.

The adjusting device may further comprise: a linkage component disposed between the positioning component and the flexible board and abutting against the flexible board, wherein the elastic member comprises a first end abutting against the positioning component and a second end abutting against the linkage component; the driving device further comprises a transmission component fixedly connected to the knob and comprising a clamping rib; and the positioning component comprises clamping teeth coupled to the clamping rib.

The knob may comprise first teeth; and the driving device may further comprise a transmission gear comprising second teeth coupled both to the first teeth and to the positioning component.

The air pressure adjustment assembly may further comprise a switch assembly fixed to the housing and comprising the start switch and at least one stop switch configured to stop one of inflating and deflating of the inflatable chamber, and the linkage component may comprise at least one contact corresponding to the stop switch, the linkage component moving correspondingly with the at least one contact according to a change in internal air pressure of the inflatable chamber and thereby configured to trigger the corresponding stop switch.

The air pressure adjustment assembly may comprise: a first wire connected to a first conductive element, wherein the first conductive element fixed to the positioning component; a second wire connected to the elastic member; and a third wire connected to a second conductive element, wherein the second conductive element is fixed to the flexible board; wherein the elastic member is electrically conductive, and the first conductive element and the elastic member are alternately in contact with the second conductive element and separated from the second conductive element according to a change in an internal air pressure of the inflatable chamber, such that the first wire and the second wire are correspondingly alternately electrically connected with the third wire and disconnected from the third wire.

The positioning component may comprise an external thread; the housing may comprise a threaded cavity comprising an internal thread that corresponds to the external thread and thereby enables the positioning component to move axially in the threaded cavity by means of rotation;

and the elastic member may be a spring compressed between the positioning component and the linkage component.

The built-in air pump assembly may further comprise an air replenishing pump disposed in the accommodating chamber.

The built-in air pump assembly may further comprise: a central control unit disposed in the accommodating chamber and electrically connected to each of the main air pump, the air replenishing pump, and the air pressure adjustment assembly.

The casing may further comprise an air port, wherein the accommodating chamber is in fluid communication with the inflatable chamber via the air port; and the built-in air pump assembly may further comprise: a reversing core axially rotatably disposed in a guide holder, whereby forming an airflow channel; an air valve corresponding to the air port; and an air valve actuator abutting against an end of the reversing core, the air valve actuator configured to alternately open and close in response to a rotation of the reversing core.

According to an aspect of another example embodiment, a built-in air pump assembly, comprises: a casing defining an accommodating chamber therein; an air pressure adjustment assembly comprising: a housing disposed in the accommodating chamber; a flexible dividing assembly defining a first chamber within the housing on a first side of the flexible dividing assembly and a second chamber, isolated from the first chamber, within the housing on a second side of the flexible dividing assembly, wherein the first chamber is in fluid communication with an inflatable chamber, and the second chamber is in fluid communication with an exterior of the inflatable chamber; and an adjusting device arranged on the second side of the flexible dividing assembly, the adjusting device comprising: a positioning component, a first conductive element comprising a first end fixed to the positioning component, and an elastic member comprising a first end fixed to the positioning component; and a driving device configured to adjust a distance between the positioning component and the flexible dividing assembly.

The elastic member may be electrically conductive, a second end of the first conductive element may be alternately disconnected from a second end of the elastic member and in electrical communication with the second end of the elastic member by means of the flexible dividing assembly.

When the elastic member is in an uncompressed state, a first distance between the second end of the elastic member and the flexible dividing assembly may be smaller than a second distance between the first conductive element and the flexible dividing assembly.

According to an aspect of another example embodiment, an inflatable product may comprise a built-in air pump assembly as described with respect to one of the above example embodiments.

BRIEF DESCRIPTION OF THE DRAWINGS

The above and/or other aspects will become apparent and more readily appreciated from the following description of example embodiments, taken in conjunction with the accompanying drawings, in which:

FIG. 8 is an exploded view of an air valve of a built-in air pump assembly;

FIG. 9a is a cross-sectional view of the air valve of FIG. 8 in a closed state;

FIG. 9b is a cross-sectional view of the air valve of FIG. 8 in an open state;

FIG. 10c is a partial enlarged view at the air valve of FIG. 10a;

DETAILED DESCRIPTION

Figure 1:
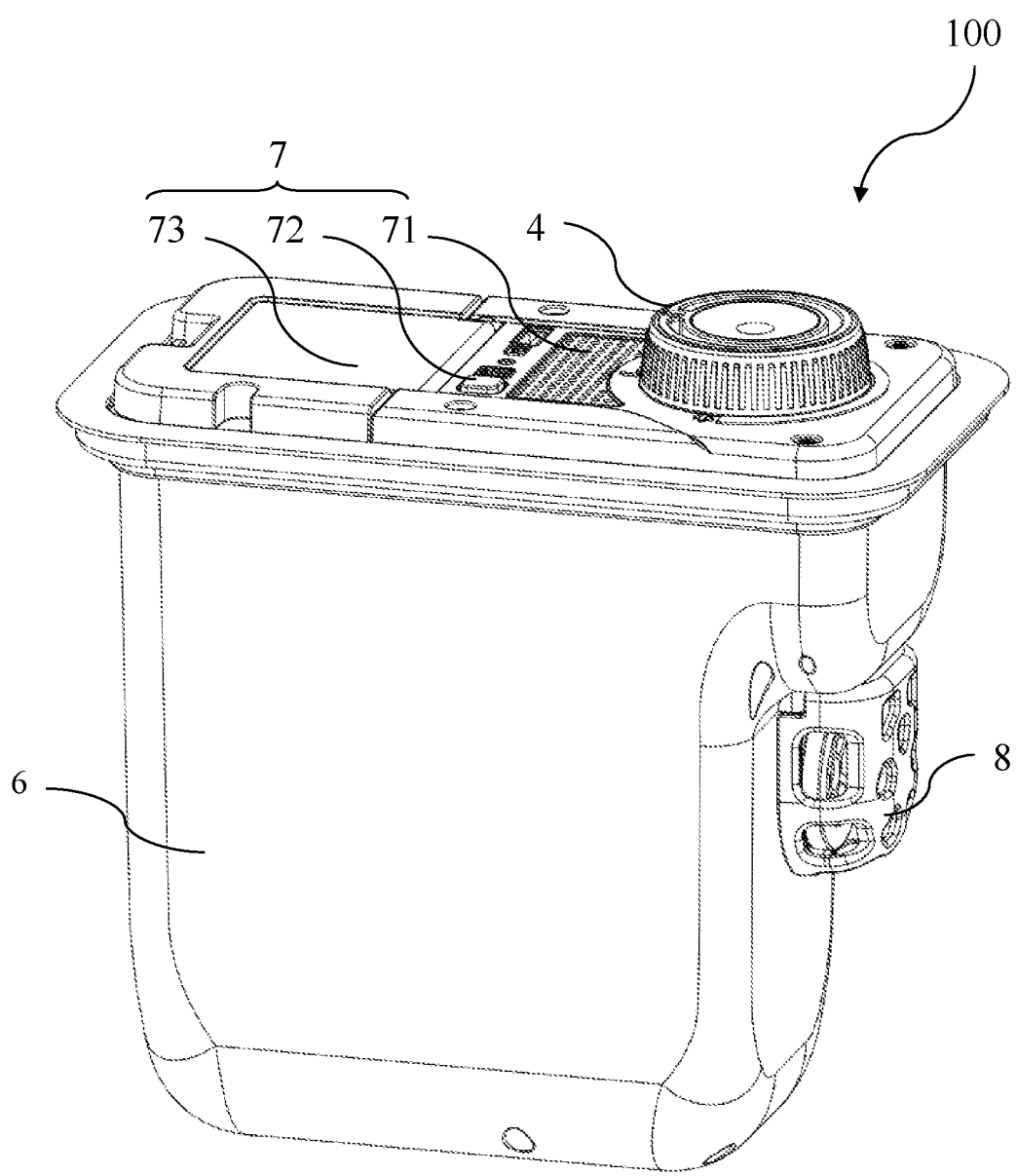
FIG. 1 is a perspective view of a built-in air pump assembly according to a first example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

It is noted that directional expressions such as "up," "down," "left," and "right" are not absolute, but relative. The directional expressions are appropriate when various components are arranged as shown in the figures, but should change accordingly when positions of the various components in the figures change.

In addition, in this text, unless otherwise explicitly defined or limited, the terms "assembled," "connected," and the like should be construed in a broad sense. For example, the connection may be a fixed connection, a detachable connection, or an integral connection, may be a mechanical connection or an electrical connection; and may be a direct connection, an indirect connection, or related by some actions. For those skilled in the art, the specific meaning of the above terms herein would have been understood according to specific circumstances.

Figure 2:
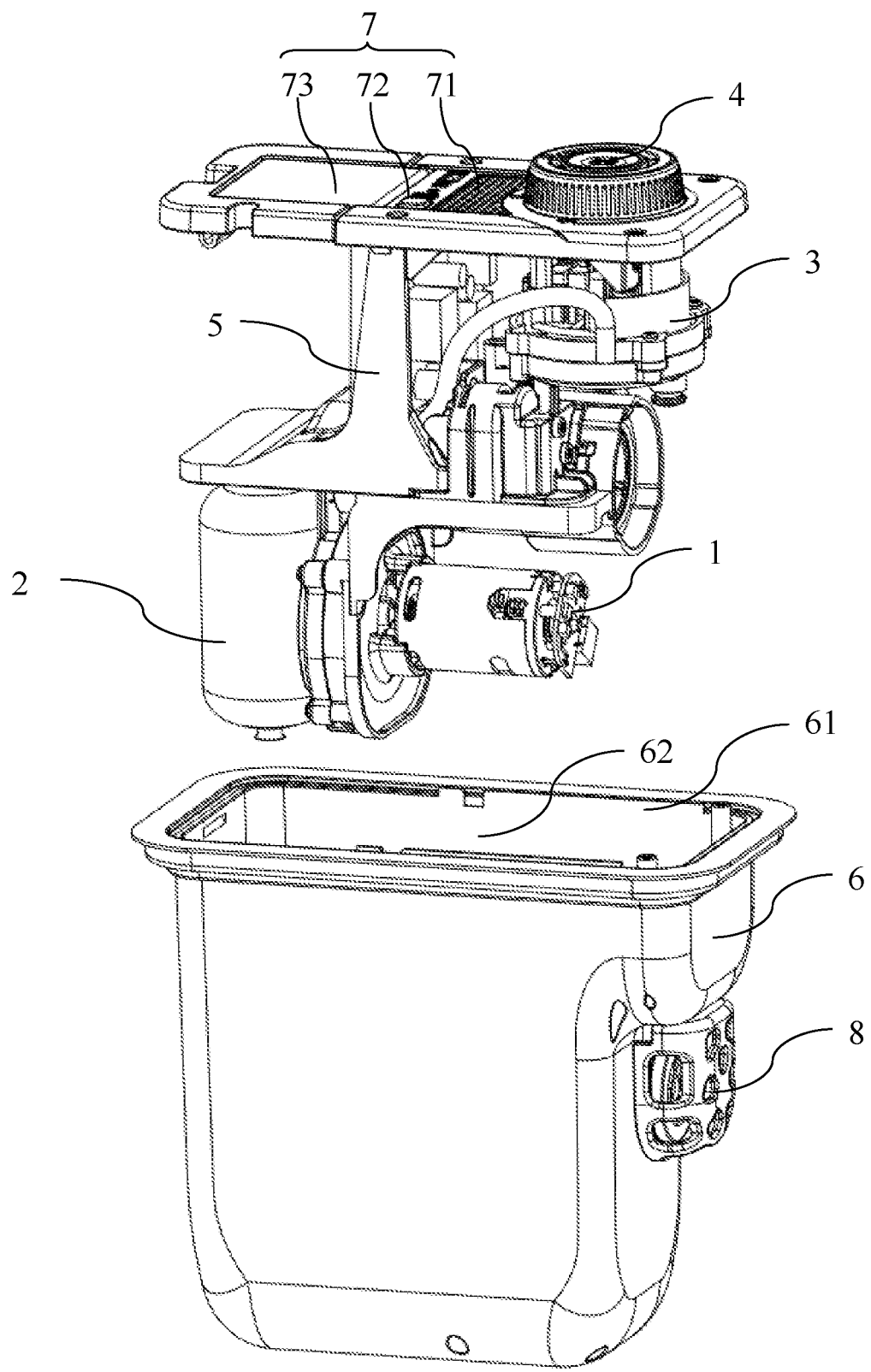
FIG. 2 is an internal structural diagram of the built-in air pump assembly of FIG. 1.
Figure 3:
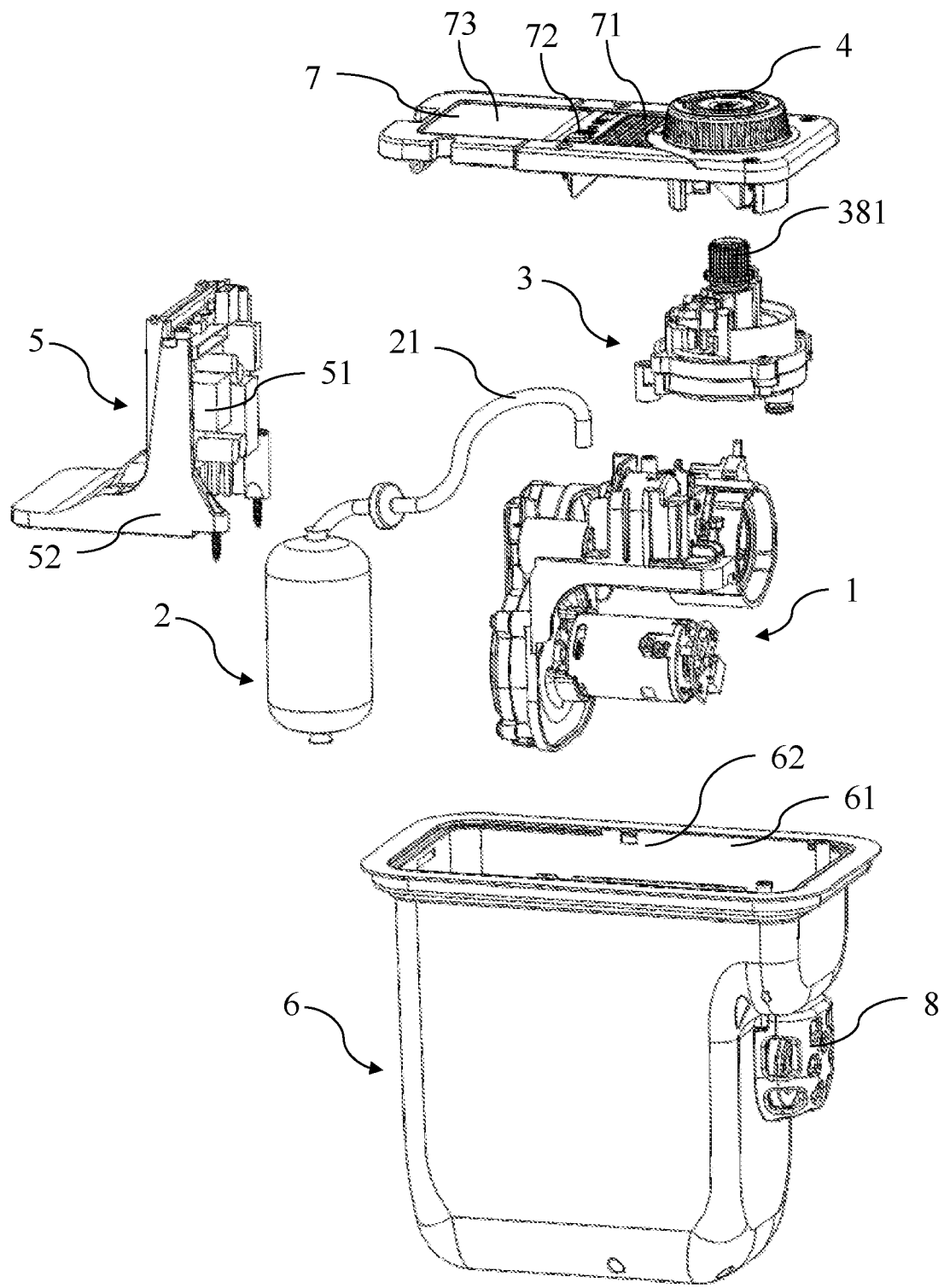
FIG. 3 is an exploded view of the built-in air pump assembly of FIG. 1.

As shown in FIGS. 1 to 3, a built-in air pump assembly 100 according to an example embodiment comprises: a main air pump 1, an air replenishing pump 2, an air pressure adjustment assembly 3, a driving device 4, a central control unit 5, a casing 6, a panel 7, and a protective cover 8.

The main air pump 1 is configured to inflate an inflatable product (for example, an inflatable mattress) or to expel air from such an inflatable product. The air replenishing pump 2 is configured to refill the inflatable product. The air pressure adjustment assembly 3 is in communication with the inflatable product to detect an internal air pressure value of the inflatable product. The driving device 4 is arranged on the panel 7 and is coupled to the air pressure adjustment assembly 3. The central control unit 5 is electrically connected to each of the main air pump 1, the air replenishing pump 2, and the air pressure adjustment assembly 3. The casing 6 is provided with an opening 61 covered by the panel 7; the casing 6 and the panel 7 jointly define an accommodating chamber 62; and the main air pump 1, the air replenishing pump 2, the air pressure adjustment assembly 3, and the central control unit 5 are all arranged in the accommodating chamber 62.

The built-in air pump assembly 100 according to an example embodiment can adjust and set the required internal air pressure value of the inflatable product in response to rotation of the driving device 4, and then initiate the main air pump 1 of the built-in air pump assembly 100 in response to the driving device 4 being pressed down and released. Regardless of whether the inflatable product is currently inflated, i.e., full of air, or deflated, the built-in air pump assembly 100 can perform automatic detection of the air pressure and can inflate or deflate the inflatable product to reach a preset pressure value. In a case in which material of the inflatable product is stretched and the air pressure drops to a certain extent, the air pressure adjustment assembly 3 sends a signal to the central control unit 5 to activate the air replenishing pump 2, and the air replenishing pump 2 starts to refill automatically. Likewise, in a case in which the pressure in the inflatable product, refilled, reaches the user-preset air pressure value, the air pressure adjustment assembly 3 sends a signal to the central control unit 5 to switch off the air replenishing pump 2.

The built-in air pump assembly 100 may be further provided with a deflation key 72 electrically connected to the central control unit 5. After a user clicks the deflation key 72, the central control unit 5 controls the main air pump to deflate the inflatable product to be in a state convenient for storage, and then the central control unit 5 automatically controls the main air pump 1 to stop.

Figure 4:
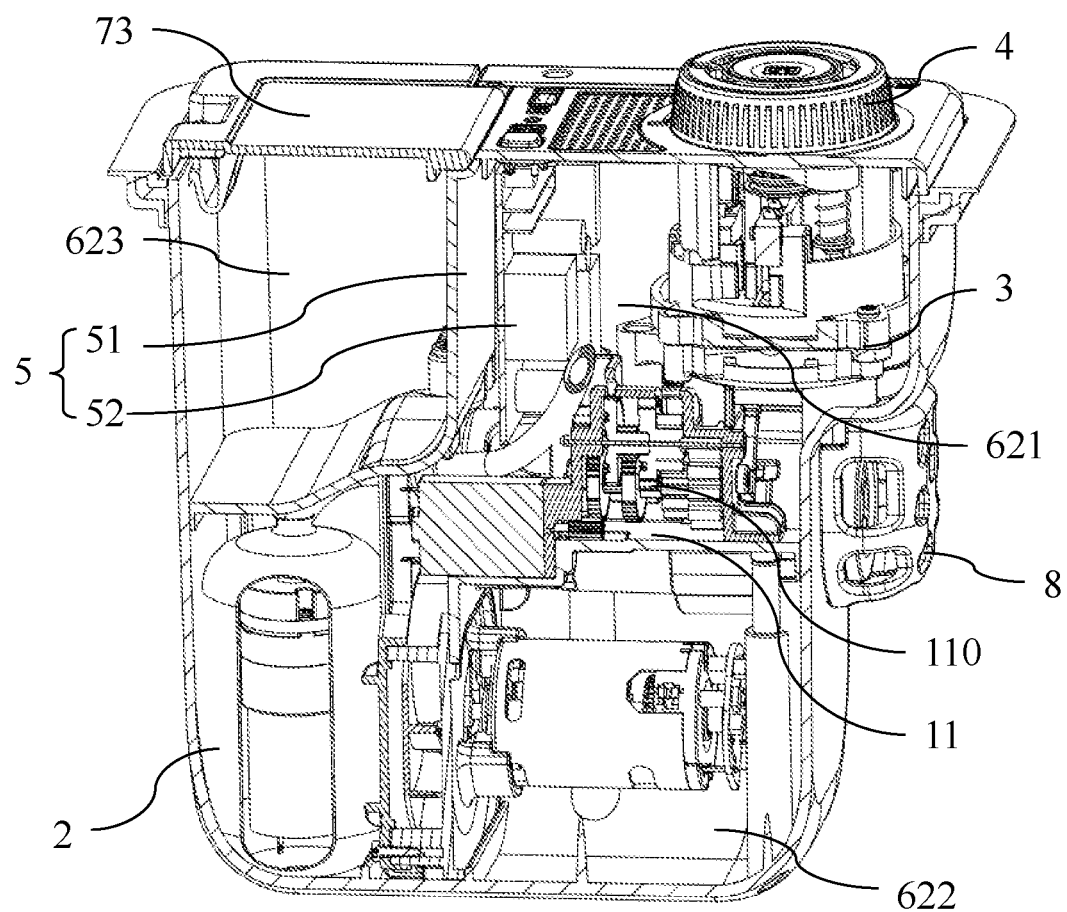
FIG. 4 is a cross-sectional view of the built-in air pump assembly of FIG. 1.
Figure 5:
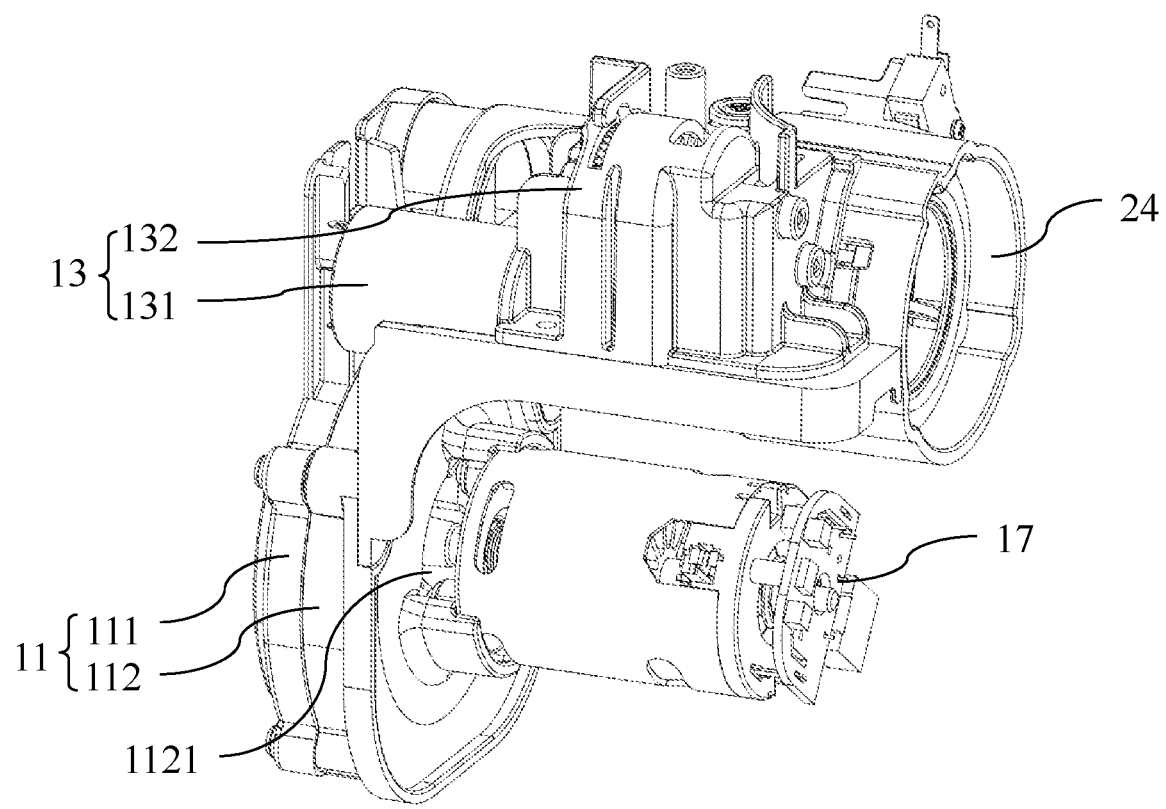
FIG. 5 is a perspective view of a main air pump of a built-in air pump assembly according to an example embodiment.
Figure 6:
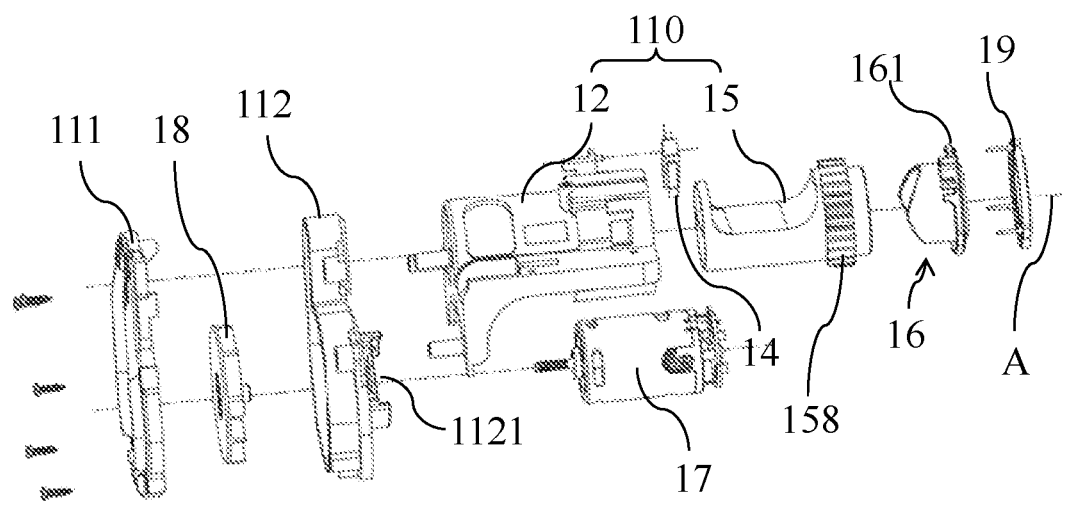
FIG. 6 is an exploded view of a main air pump of a built-in air pump assembly according to an example embodiment.

As shown in FIGS. 4 to 6, the main air pump 1 comprises a blade cover 11, a guide holder 12, a reversing drive assembly 13, an optional microswitch 14, a reversing core 15, an air valve actuator 16, an air valve actuator seal ring 19, and a main motor 17. The reversing drive assembly 13 comprises a reversing motor 131 and an optional gearbox 132, and one or more transmission gears (not shown) installed in the gearbox 132. The reversing core 15 is axially rotatably arranged in the guide holder 12, and the guide holder 12 and the reversing core 15 jointly constitute an air channel switching device 110. The blade cover 11 and the guide holder 12 jointly divide the accommodating chamber 62 into a driving chamber 621 and a blade chamber 622, the driving chamber 621 being in communication with an external space of the built-in air pump assembly 100. It can be understood that according to one or more example embodiments, the blade cover 11 and the guide holder 12 may be integrally formed. The blade cover 11 comprises an upper blade cover 111 and a lower blade cover 112, the lower blade cover 112 being provided with a through hole 1121. An impeller 18 is arranged in the blade cover 11. The main motor 17 is electrically connected to the central control unit 5. A rotating shaft of the main motor 17 passes through the through hole 1121 to be connected to the impeller 18. The gearbox 132 (and one or more transmission gears therein) is optional for transmitting a torque of the reversing motor 131 to the reversing core 15 by driving teeth 158 arranged on a side of the reversing core 15, such that the reversing core 15 can be rotated in the guide holder 12. The air valve actuator 16 is configured to move in the guide holder 12 along an axis A. When the reversing core 15 rotates toward a position for the built-in air pump assembly 100 to inflate and deflate, the air valve actuator 16 is ejected to the right (i.e., in a direction away from the accommodating chamber 62), and the air channel switching device 110 allows an air chamber to be in fluid communication with the accommodating chamber 62; and when the reversing core 15 rotates toward a position for the built-in air pump assembly 100 to stop inflating and deflating, the air valve actuator 16 retracts to the left (i.e., in a direction toward the inside of the accommodating chamber 62), and the air channel switching device 110 isolates the air chamber from the accommodating chamber 62.

Figure 7:
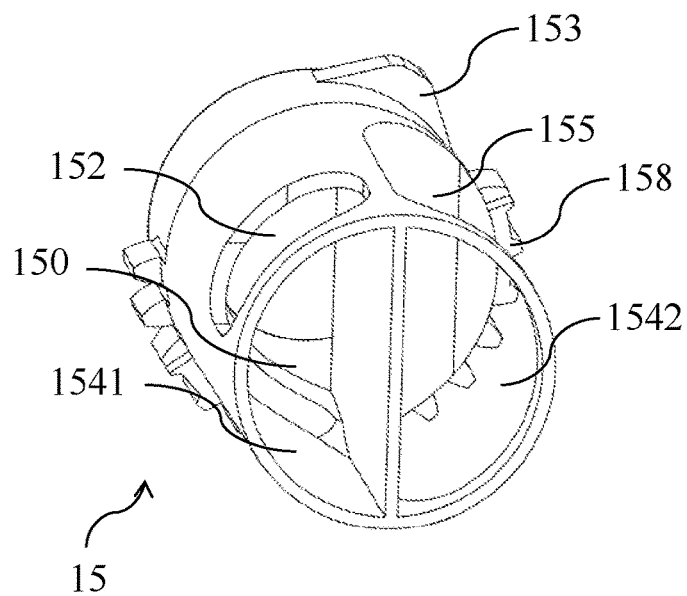
FIG. 7 is a perspective view of a reversing core of an air channel switching device of the main air pump of FIG. 6.
Figure 7A:
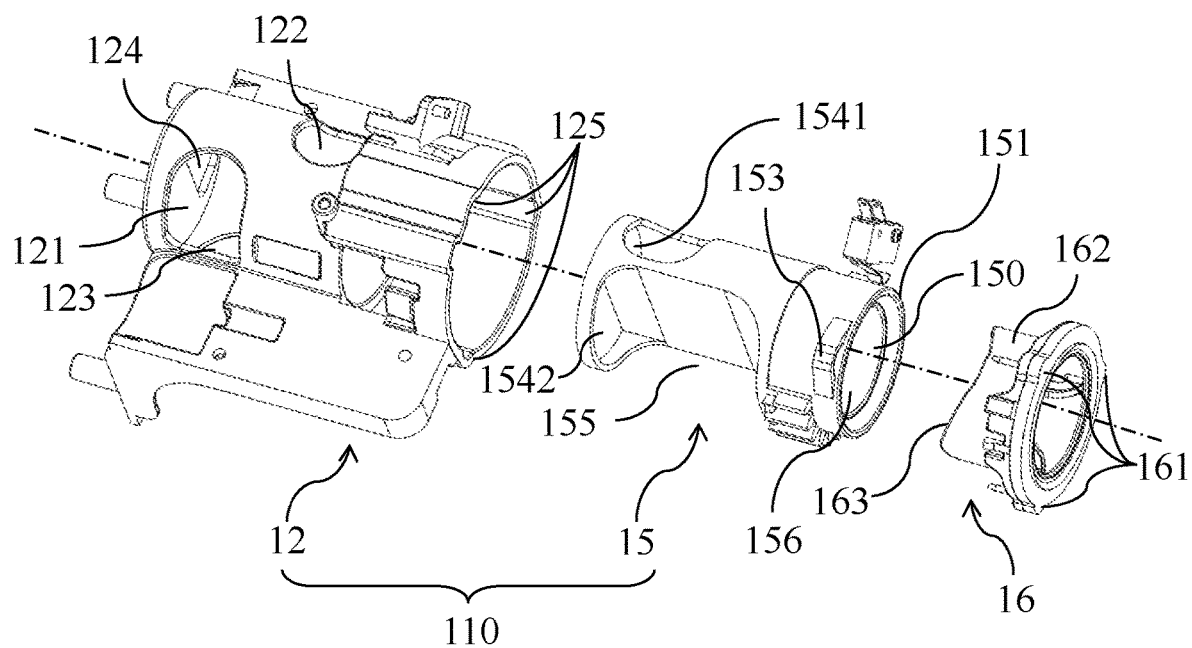
FIG. 7a is an exploded view of the air channel switching device of the main air pump of FIG. 6 in an inflated state.
Figure 7B:
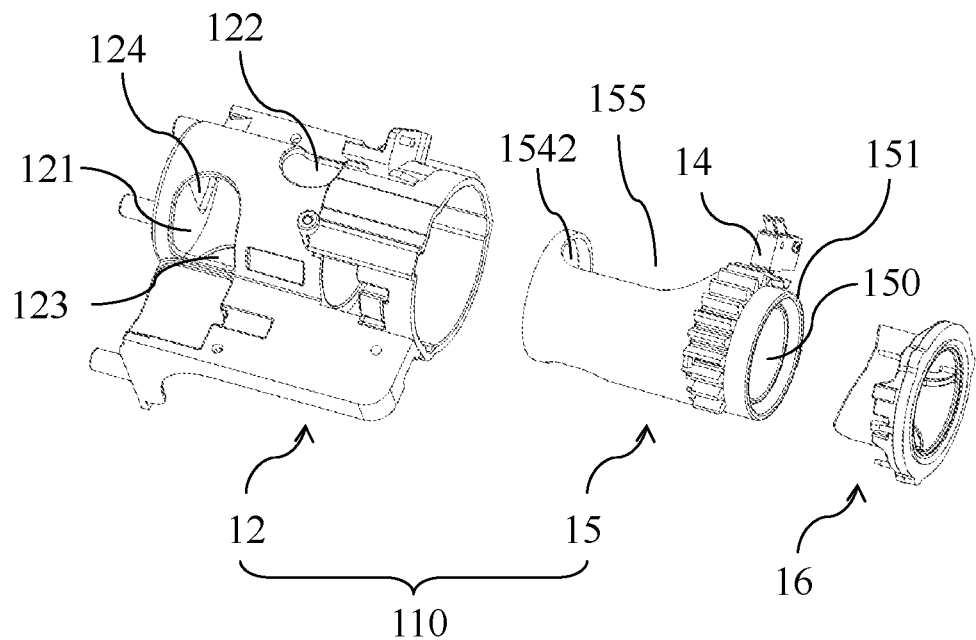
FIG. 7b is an exploded view of the air channel switching device of the main air pump of FIG. 6 in a deflated state.
Figure 7C:
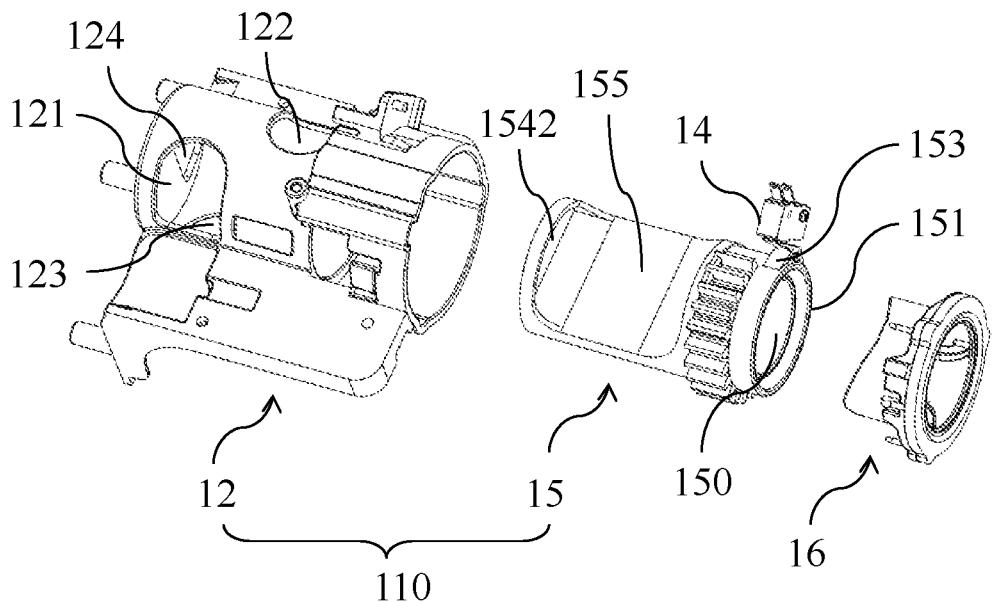
FIG. 7c is an exploded view of the air channel switching device of the main air pump of FIG. 6 in a stopped state.
Figure 7D:
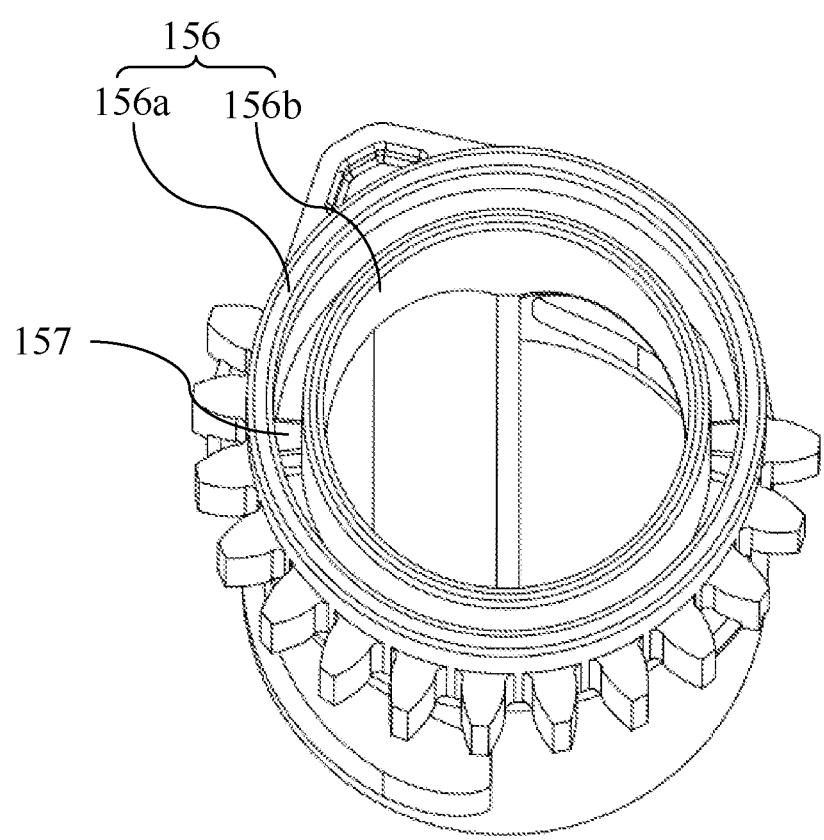
FIG. 7d is a cross-sectional view of a built-in air pump assembly at an air channel switching device.

As described above, the air valve actuator 16 is configured to move axially in response to rotation of the reversing core 15. As shown in FIGS. 7a to 7c, the air valve actuator 16 has a tubular portion 162 extending to the side where the guide holder 12 is located. An edge of an end of the tubular portion 162 is provided with a working portion 163 arranged axially obliquely with respect to the air valve actuator 16. The tubular portion 162 is nested in a groove 156 at an end of the reversing core 15 to avoid potential wobbling, which can also greatly reduce wind pressure loss caused by airflow flowing out of a gap between the reversing core 15 and the air valve actuator 16. Referring to FIG. 7d, an outer cylindrical wall 156a and an inner cylindrical wall 156b that are coaxial are formed at the end of the reversing core 15, the cylindrical walls 156a and 156b defining the groove 156 described above. To match the working portion 163, one or more bumps 157 is/are arranged in the groove 156, each bump 157 being in contact with a working portion 163. Where the air valve actuator 16 and the reversing core 15 rotate relative to each other, each bump 157 slides along the corresponding working portion 163, so that the air valve actuator 16 and the reversing core 15 move axially relative to each other. Meanwhile, the rotation of the air valve actuator 16 around an axis is limited relative to the guide holder 12. For example, the air valve actuator 16 is nested in the guide holder 12, and an outer contour of the air valve actuator 16 and an inner wall contour of the guide holder 12 cooperate to limit the rotation of the air valve actuator 16 relative to the guide holder 12. Optionally, referring to FIG. 7a, the air valve actuator 16 has a substantially circular outer contour projection, and the periphery of the air valve actuator 16 is provided with a plurality of protrusions 161. An inner wall of the guide holder 12 is provided with a plurality of guide grooves 125 that match the plurality of protrusions 161, so that the air valve actuator 16 can slide along the plurality of guide grooves. Thus, when the reversing core 15 rotates in the guide holder 12, the air valve actuator 16 is correspondingly driven to slide relative to the guide holder 12. As an alternative solution, the air valve actuator 16 may have an outer contour projection of another shape (which is for example, but not limited to, substantially oval, triangular, square or rectangular), and the inner wall of the guide holder 12 correspondingly has the inner wall contour that matches the outer contour of the air valve actuator 16 to restrain the rotation of the air valve actuator 16 around an axis.

It can be understood that the positions of the bumps 157 and of the working portion 163 may be interchanged in other example embodiments, i.e., the bumps 157 may be optionally arranged on the air valve actuator 16 while the working portion 163 is correspondingly arranged in the groove 156. It can also be understood that the groove 156 is optional, for example, in other example embodiments, the inner cylindrical wall 156b may be omitted.

A tube wall of the guide holder 12 is provided with a first opening 121 and a second opening 122 that are in communication with the driving chamber 621, a third opening 123 in communication with the blade chamber 622, and a fourth opening 124 in communication with the blade cover 11. As shown in FIG. 7, the reversing core 15 comprises an air channel 150 and a recess 155. A first opening 151 of the reversing core 15 is provided at the top of the reversing core 15, a second opening 152 of the reversing core 15 is provided in a side wall of the reversing core 15, and a third opening 1541 and a fourth opening 1542 of the reversing core 15 are provided at the bottom of the reversing core 15. The first opening 151, the second opening 152 and the third opening 1541 of the reversing core 15 are in communication with the air channel 150, and the fourth opening 1542 is in communication with the recess 155. The first opening 151 is in fluid communication with an inflatable chamber 1002 of the inflatable product by means of the air valve actuator 16. By means of rotating the reversing core 15, the corresponding relationship between a wall surface of the reversing core 15 and the opening on the guide holder 12 is changed, achieving the purpose of switching airflow channels.

Figure 10A:
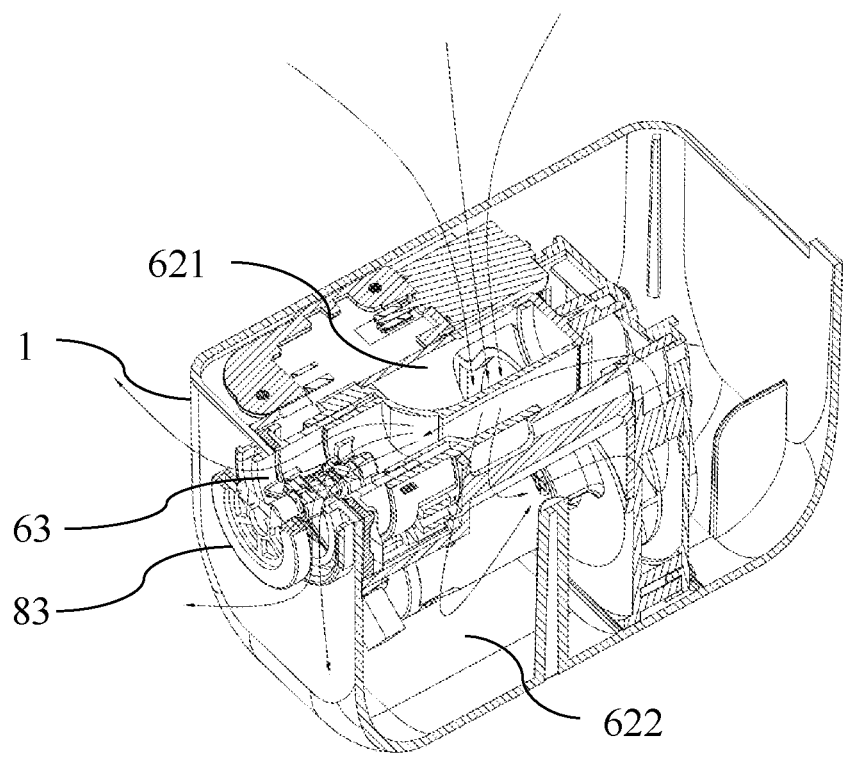
FIG. 10a is a schematic diagram of a built-in air pump assembly in an inflated state.

As shown in FIGS. 7a and 10a, when the built-in air pump assembly 100 is to be inflated, the reversing core 15 is rotated to a position in which the second opening 122 of the guide holder 12 is blocked and closed by a tube wall of the reversing core 15, and the first opening 121, the third opening 123, and the fourth opening 124 of the guide holder 12 are opened. The first opening 121 and the third opening 123 of the guide holder 12 are in communication with each other via the recess 155. The fourth opening 124 of the guide holder 12 is aligned with the third opening 1541 of the reversing core 15, while the air valve actuator 16 is ejected to the right to open the air channel 150. An outside gas enters the driving chamber 621 via a first air port 71 on the panel 7, enters the blade chamber 622 via the first opening 121 of the guide holder 12, the recess 155, and the third opening 123 in sequence, and then enters the blade cover 11 via the through hole 1121. The gas, pressurized by the impeller 18, enters the air channel 150 of the reversing core 15 via the fourth opening 124 of the guide holder 12, and enters the inside of the inflatable product via the first opening 151 of the reversing core 15 and a second air port 63 of the casing 6 in sequence. In this way, the inflatable product P is inflated.

Figure 10B:
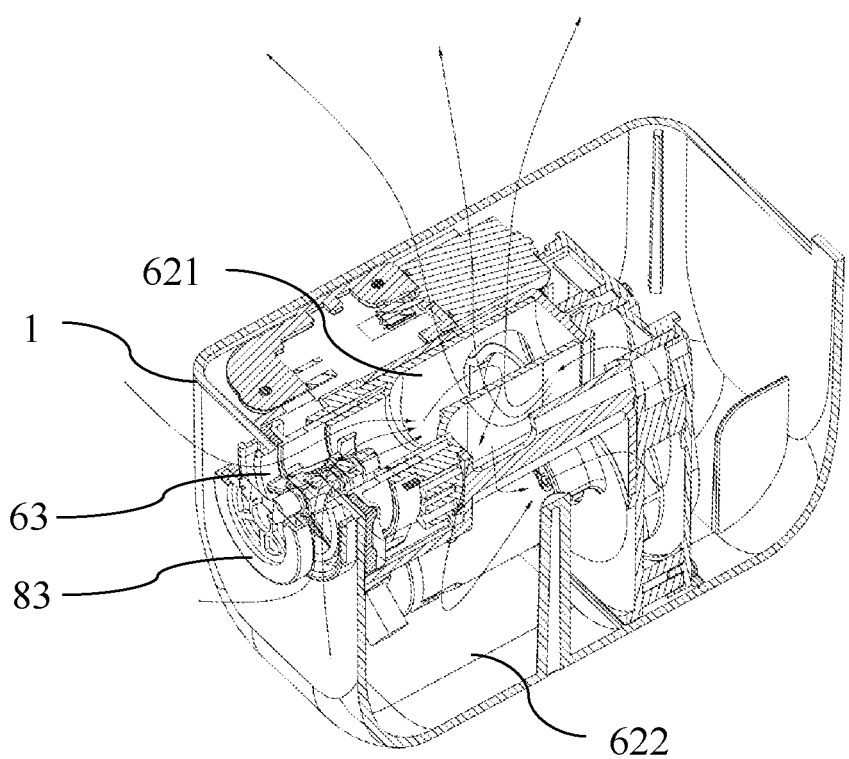
FIG. 10b is a schematic diagram of a built-in air pump assembly in a deflated state.

As shown in FIGS. 7b and 10b, when the inflatable product is to be deflated by means of the built-in air pump assembly 100, the reversing core 15 is rotated to a position in which the first opening 121 of the guide holder 12 is blocked and closed by the tube wall of the reversing core 15, and the second opening 122, the third opening 123, and the fourth opening 124 of the guide holder 12 are opened. The third opening 123 of the guide holder 12 is aligned with the second opening 152 (as shown in FIG. 7) of the reversing core 15, the fourth opening 124 of the guide holder 12 is aligned with the fourth opening 1542 of the reversing core 15, and the fourth opening 124 of the guide holder 12 is in communication with the second opening 122 by means of the recess 155. The air valve actuator 16 is ejected to the right to open the air channel 150. The gas in the inflatable product enters the air channel 150 via the second air port 63 of the casing 6 and the first opening 151 of the reversing core 15, enters the blade chamber 622 via the second opening 152 of the reversing core 15, and the third opening 123 of the guide holder 12, and then enters the blade cover 11 via the through hole 1121. The gas, pressurized by the impeller 18, enters the recess 155 via the fourth opening 124 of the guide holder 12 and the fourth opening 1542 of the reversing core 15, then enters the driving chamber 621 via the second opening 122 of the guide holder 12, and is expelled from the first air port 71 to the outside.

As shown in FIG. 7c, when the inflating or deflating of the inflatable product is to be stopped, the reversing core 15 is rotated to a position in which the third opening 123 of the guide holder 12 is blocked and closed by the tube wall of the reversing core 15, and at the same time, the air valve actuator 16 retracts toward the inside of the guide holder 12 to close the air channel 150. The end of the reversing core 15 is provided with a bulge 153. A stop signal is sent to the central control unit 5 in response to the bulge 153 triggering the microswitch 14, so as to stop driving the reversing motor 131. The gas referenced herein may be, but is not limited to, air.

The air replenishing pump 2 is provided with an air supply pipe 21 in communication with the driving chamber 621. Where the air replenishing pump 2 performs refilling, the outside gas enters the driving chamber 621 via the first air port 71 of the panel 7, and the gas, pressurized by the air replenishing pump, enters the inside of the inflatable product via an air outlet (not shown in the figures) of the air replenishing pump 2. Optionally, a vibration absorbing material (such as, but not limited to, a cotton fiber, a polyester fiber and other fillers) wrapping part or all of the air replenishing pump 2 is arranged in the accommodating chamber 62 to reduce vibration of the air replenishing pump 2 when the air replenishing pump 2 is in operation. The air replenishing pump 2 may optionally be an air pump with low noise and correspondingly low output power.

As shown in FIGS. 1 to 3, the central control unit 5 comprises a control circuit board 51, a circuit board mount 52 fixing the control circuit board 51 in the accommodating chamber 62. The panel 7 comprises a power cord cover plate 73, the circuit board mount 5 and the power cord cover plate 73 defining a power cord placement cavity 623 (as shown in FIG. 4). The central control unit 5 is programmed to send, according to the internal air pressure value of the inflatable product detected by the air pressure adjustment assembly 3 and a preset inflation air pressure value, a start signal or a stop signal to the main air pump 1 or the air replenishing pump 2 to initiate or stop the main air pump 1 or the air replenishing pump 2. The central control unit 5 comprises, for example, one or more microprocessors arranged on a printed circuit board (PCB).

The panel 7 is fixedly connected to the casing 6 and covers at least a part of the opening 61, and preferably the panel 7 covers the entire opening 61. The panel 7 is provided with a first air port 71, and the built-in air pump assembly 100 is in fluid communication with the outside via the first air port 71. A side face of the casing 6 is provided with a second air port 63 (the second air port 63 is covered by the protective cover 8 in FIGS. 1 to 3), and the built-in air pump assembly 100 is in fluid communication with the inflatable chamber 1002 of the inflatable product via the second air port 63. The first air port 71 is in fluid communication with the second air port 63 via the accommodating chamber 62.

As shown in FIGS. 8 to 9b, the side face of the casing 6 is further provided with an air valve 83 corresponding to the second air port 63, and a support member 86 is arranged at the second air port 63; and a support member through-hole 861 is formed in the center of the support member 86, a valve stem 831 of the air valve 83 passes through the support member through-hole 861, and the air valve 83 is movable in a length direction of the valve stem 831. The air valve actuator 16 cooperates with the air valve 83 to control a fluid channel between the gas-filled air chamber and the accommodating chamber 62. A first end 832 of the valve stem 831 is connected to a limit member 85. A second end of the valve stem 831 is provided with a valve head 833, the valve head 833 having a diameter greater than the diameter of the valve stem 831, and the periphery of the valve head 833 being sleeved with a seal ring 82. The first end 832 of the valve stem 831 extends to the air valve actuator 16. A spring 84, with opposite ends abutting against the support member 86 and the limit member 85, is sleeved around the outer side of the valve stem 831. The spring 84 and the limit member 85 are both located inside the casing 6, and the valve head 833 is located outside the casing 6. In other words, the limit member 85 and the spring 84 bias the air valve 83 toward a closed position.

Figure 10C:
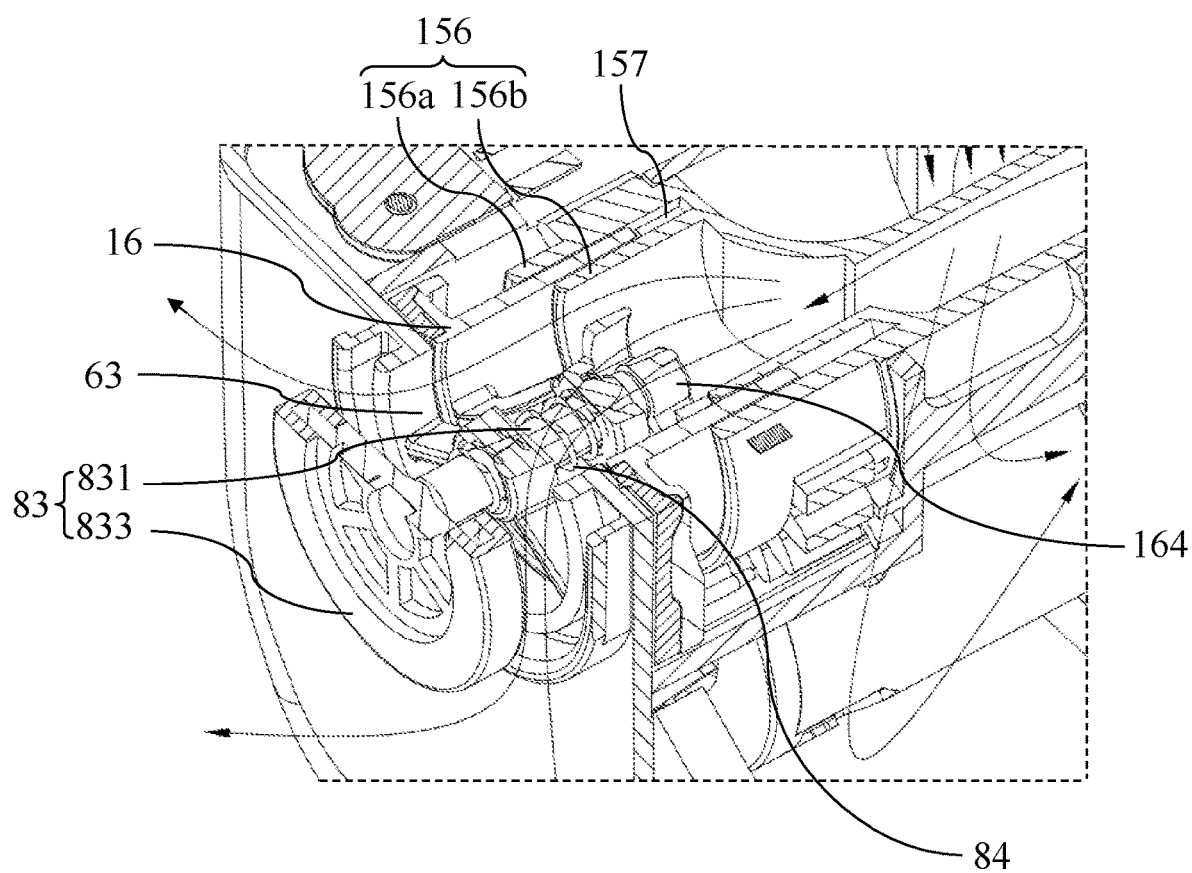

As shown in FIGS. 10a to 10c, the air valve actuator 16 abuts against the right end of the reversing core 15, and causes the air valve 83 to be opened or closed in response to a rotation of the reversing core 15. The end of the valve stem 831 abuts against a central portion 164 of the air valve actuator 16. Thus, in addition to biasing the air valve 83 toward the closed position, the spring 84 pushes the air valve actuator 16 to keep the working portion 163 of the air valve actuator 16 in contact with one or more bumps 157 on the reversing core 15. When the built-in air pump assembly is switched to the inflated state, the reversing core 15 is driven to rotate relative to the guide holder 12. Accordingly, the working portion 163 of the air valve actuator 16 slides relative to the bump 157, such that the air valve actuator 16 is pushed to slide toward the side where the air valve 83 is located. The air valve actuator 16 further pushes the valve stem 831 (and the valve head 833) to slide until the air valve 83 opens the second air port 63, and the accommodating chamber 62 is in fluid communication with the inside of the inflatable product via the second air port 63, thereby allowing the gas to flow through the second air port 63, such that the air pump can inflate or deflate the inflatable product. The gas flow directions during inflation and deflation are indicated by arrows in FIGS. 10a and 10b, respectively. According to another example aspect, when the built-in air pump assembly is switched to a stopped state, the reversing core 15 is driven to rotate relative to the guide holder 12. Accordingly, the working portion 163 of the air valve actuator 16 slides relative to the bump 157, and the spring 84 applies pressure to the central portion 164 of the air valve actuator 16 by means of the valve stem 831, such that the air valve actuator 16 is pushed to slide away from the side where the air valve 83 is located until the air valve 83 closes the second air port 63, thereby interrupting the fluid communication between the accommodating chamber 62 and the inside of the inflatable product.

In an example embodiment shown in FIGS. 10a to 10c, the spring 84 is a compression spring. It can be understood, however, that in one or more alternate example embodiments, the spring 84 may be replaced with elastic components (such as, but not limited to, an extension spring and a torsion spring) in other forms, the elastic components biasing the air valve 83 toward the closed position.

The working principle of an air valve control system is described in detail above based on FIGS. 7 to 10c. The air valve control system comprises the reversing core 15, the air valve actuator 16, and the air valve 83 as described above. In response to the rotation of the reversing core 15, the air valve actuator 16 pushes the air valve 83 to move. The air valve control system may further comprise the reversing drive assembly 13 as described above. It can be understood that the air valve control system may be used in conjunction with, but is not limited to, the built-in air pump assembly 100 in the example embodiments described above.

Optionally, the side face of the casing 6 may further comprise the protective cover 8. The protective cover 8 can protect the air valve 83, and can also prevent the wall of the inflatable product or a tensioning member in the inflatable product from being adsorbed onto the air valve 83, thereby avoiding the operation (especially a deflating operation of the inflatable product) of the built-in air pump assembly from being affected.

Figure 11:
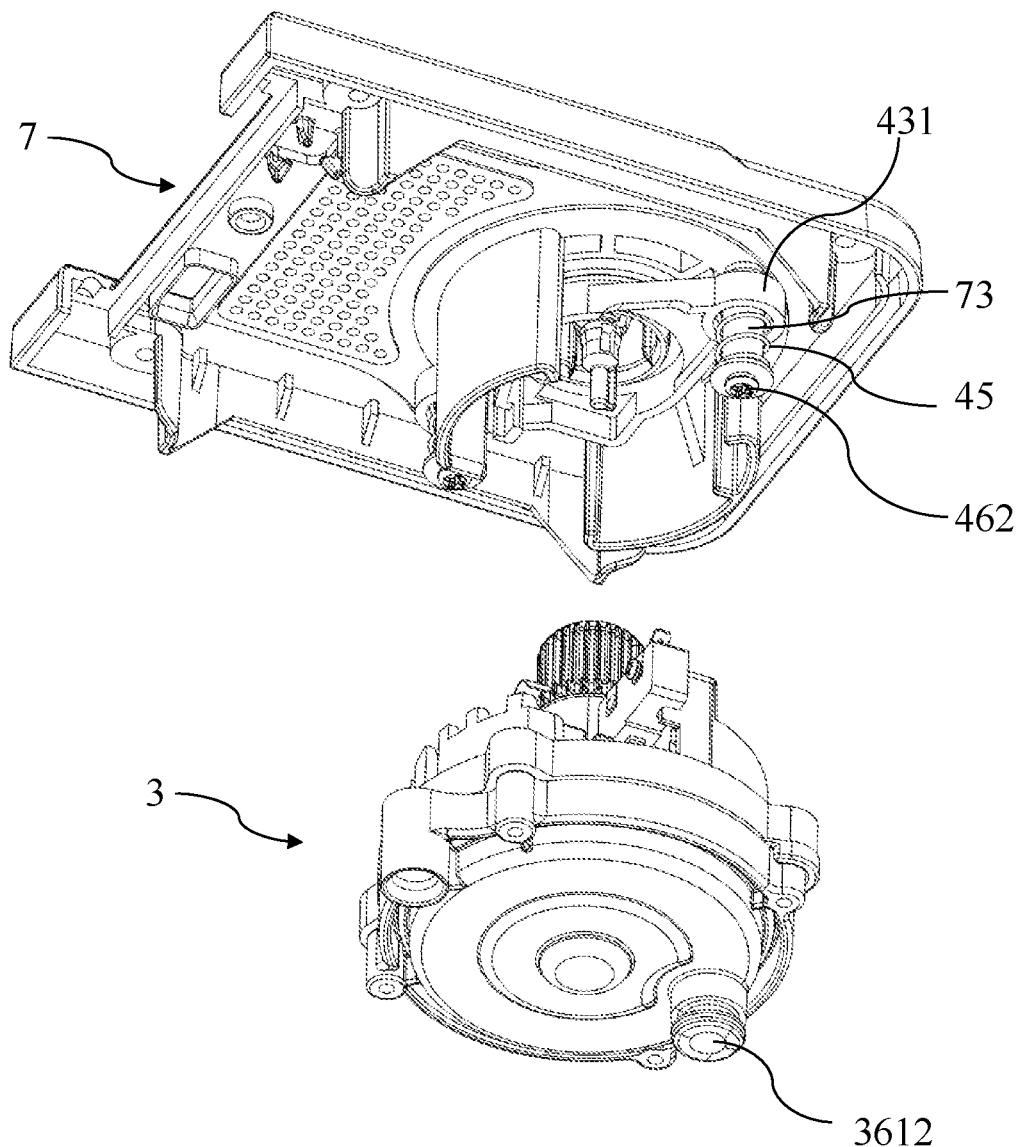
FIG. 11 is a schematic diagram of connection between an air pressure adjustment assembly and a panel of the built-in air pump assembly of FIG. 1 according to an example embodiment.
Figure 12:
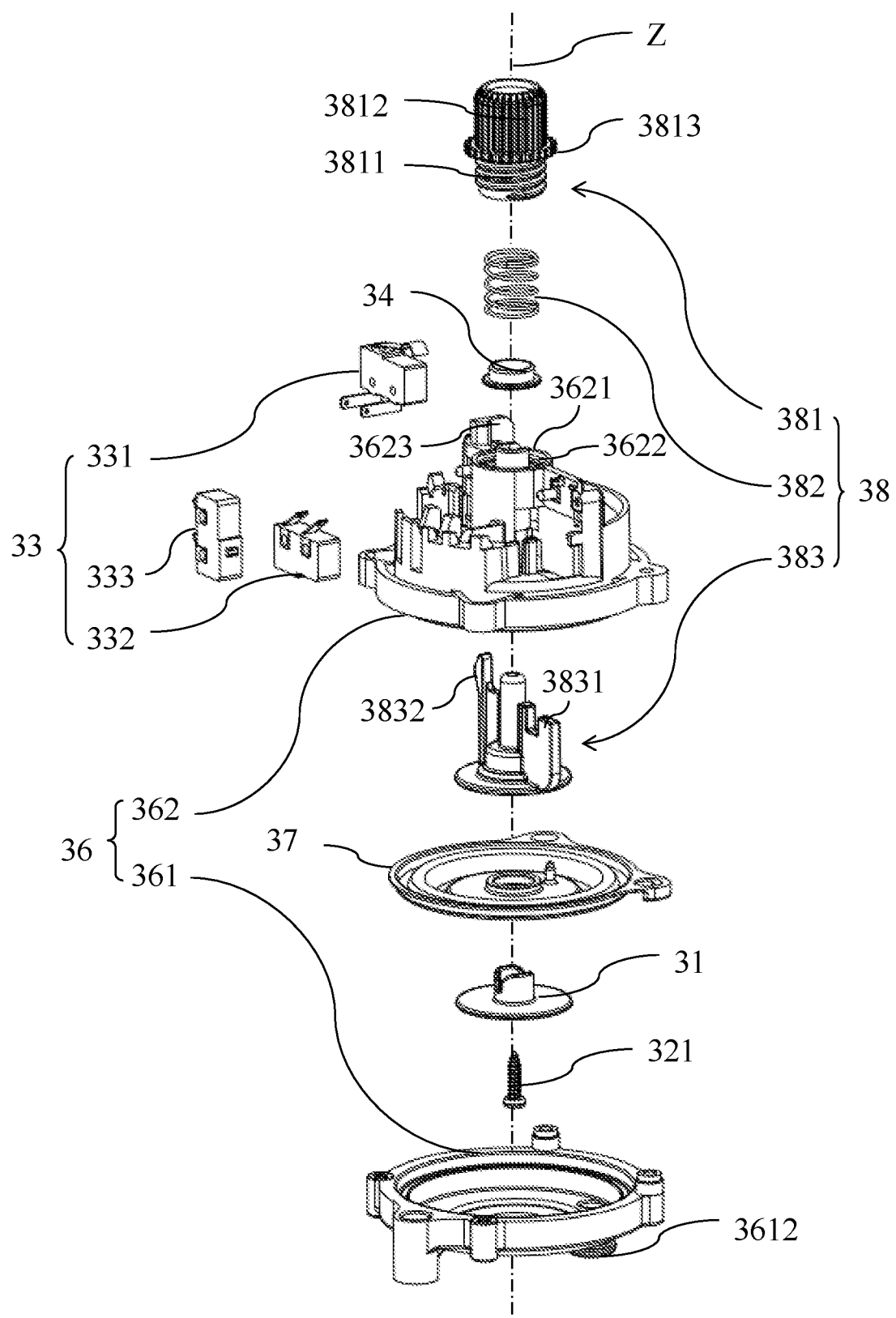
FIG. 12 is an exploded view of the air pressure adjustment assembly of FIG. 11.
Figure 13:
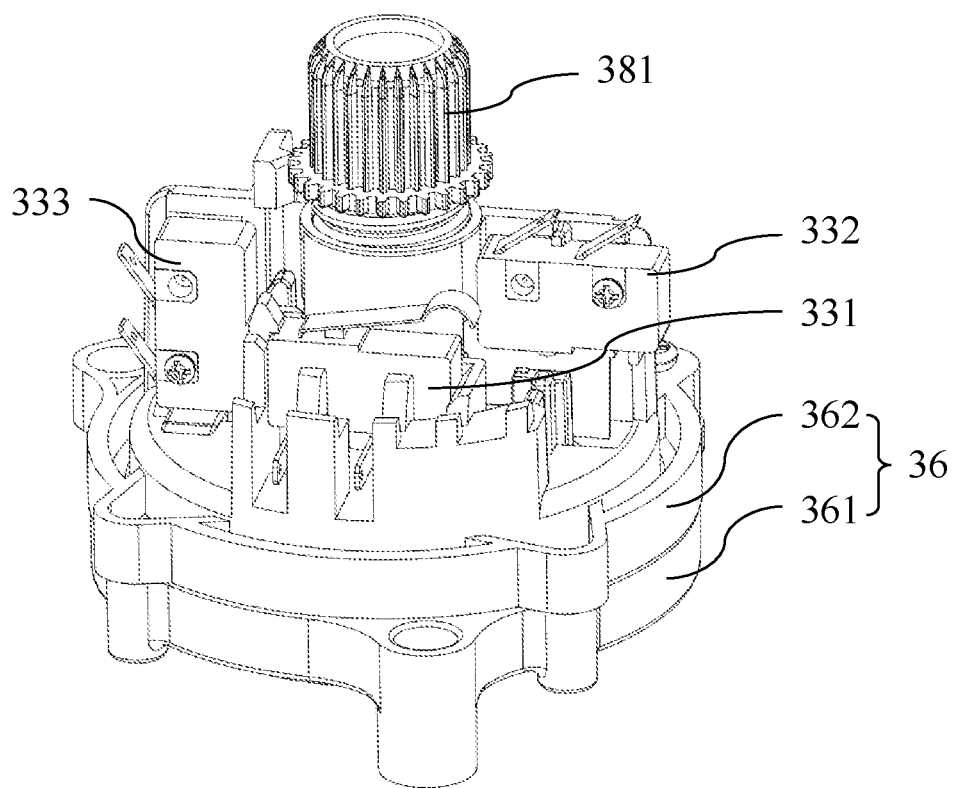
FIG. 13 is a perspective view of the air pressure adjustment assembly of FIG. 11.

As shown in FIGS. 11 and 12, the air pressure adjustment assembly 3 comprises a housing 36, a flexible board 37, and an adjusting device 38. The flexible board 37 is optionally made of silicone rubber or other elastic materials. The flexible board 37 divides the internal space of the housing 36 into a first chamber 3611 and a second chamber 3621. The first chamber 3611 is in fluid communication with the inside of the inflatable product via an air intake pipe 3612, and the second chamber 3621 is in fluid communication with the outside of the inflatable product. The adjusting device 38 comprises a positioning component 381, an elastic member 382, and a linkage component 383. The elastic member 382 is arranged between the positioning component 381 and the linkage component 383, and the linkage component 383 is arranged between the positioning component 381 and the flexible board 37 and abuts against the flexible board 37 from the side at which the second chamber 3621 is located. The position of the upper end of the elastic member 382 is defined by the positioning component 381, for example, the upper end of the elastic member 382 abuts against the positioning component 381 or is embedded into the positioning component 381. The lower end of the elastic member 382 abuts against the linkage component 383.

The driving device 4 is coupled to the positioning component 381 for driving the positioning component 381 to move relative to the housing 36 to adjust the distance between the positioning component 381 and the flexible board 37. For example, the positioning component 381 may be driven to move relative to the housing 36 along its axis of rotation.

Detailed structures of the air pressure adjustment assembly 3 and the driving device 4, according to one or more example embodiments, are described below with reference to FIGS. 11 to 28b.

FIGS. 11 to 14 show an example embodiment of the air pressure adjustment assembly 3.

The air pressure adjustment assembly 3 is a mechanical air pressure sensor, and the air pressure adjustment assembly 3 is arranged in the driving chamber 621. The housing 36 of the air pressure adjustment assembly 3 comprises a first housing 361 and a second housing 362 located above the first housing 361. The flexible board 37 may be at least partially located in the first housing 361 and the second housing 362. A connecting member 31 is arranged below the flexible board 37, and a screw 321 passes sequentially through holes in the centers of the connecting member 31 and the flexible board 37 to fix the connecting member 31 and the flexible board 37 to the linkage component 383. According to one or more example embodiments, in the air pressure adjustment assembly 3, when the first housing 361 and the second housing 362 are assembled together, a part of the flexible board 37 (for example, the periphery of the flexible board 37) may be sandwiched between the first housing 361 and the second housing 362 and may correspondingly forms a seal. The flexible board 37 defines a first chamber 3611 and a second chamber 3621 in the housing 36. The internal space of the housing 36 is in communication with the air chamber of the inflatable product via the air intake pipe 3612. For example, the first chamber 3611 is in communication with the air chamber of the inflatable product. The first chamber 3611 is located in an area substantially defined by the flexible board 37 and the second housing 362, and the second chamber 3621 is located in an area substantially defined by the flexible board 37 and the first housing 361.

When the air pressure in the inflatable product rises, the air pressure in the first chamber 3611 correspondingly rises and acts on the flexible board 37 to push the flexible board 37 toward the second housing 362. Correspondingly, flexible board 37 pushes the linkage component 383 to move together; and when the air pressure in the inflatable product drops, the air pressure in the first chamber 3611 drops at the same time, and under the action of the elastic member 382, the linkage component 383 pushes the flexible board 37 to move toward the first housing 361.

As shown in FIG. 12, an external thread 3811 is provided at the lower end of the positioning component 381, the second housing 362 is provided with a threaded cavity 3621, and an inner wall of the threaded cavity 3621 is provided with an internal thread 3622 that matches the external thread 3811, so that the positioning component 381 can move axially in the threaded cavity 3621 along an axis Z when the positioning component rotates along the axis. The elastic member 382 may be sleeved around the linkage component 383, and as the positioning component 381 is located at different positions, the elastic member 382 can apply different degrees of acting force onto the positioning component 381. Accordingly, the positioning component 381 is located at different positions along the axis Z, so that the flexible board 37 and the linkage component 383 are subjected to different degrees of mechanical resistance. The positioning component 381 may also be provided with positioning teeth 3813, and the second housing 362 may be provided with pawls 3623 that match the positioning teeth 3813 to prevent the positioning component 381 from rotating freely.

Figure 14:
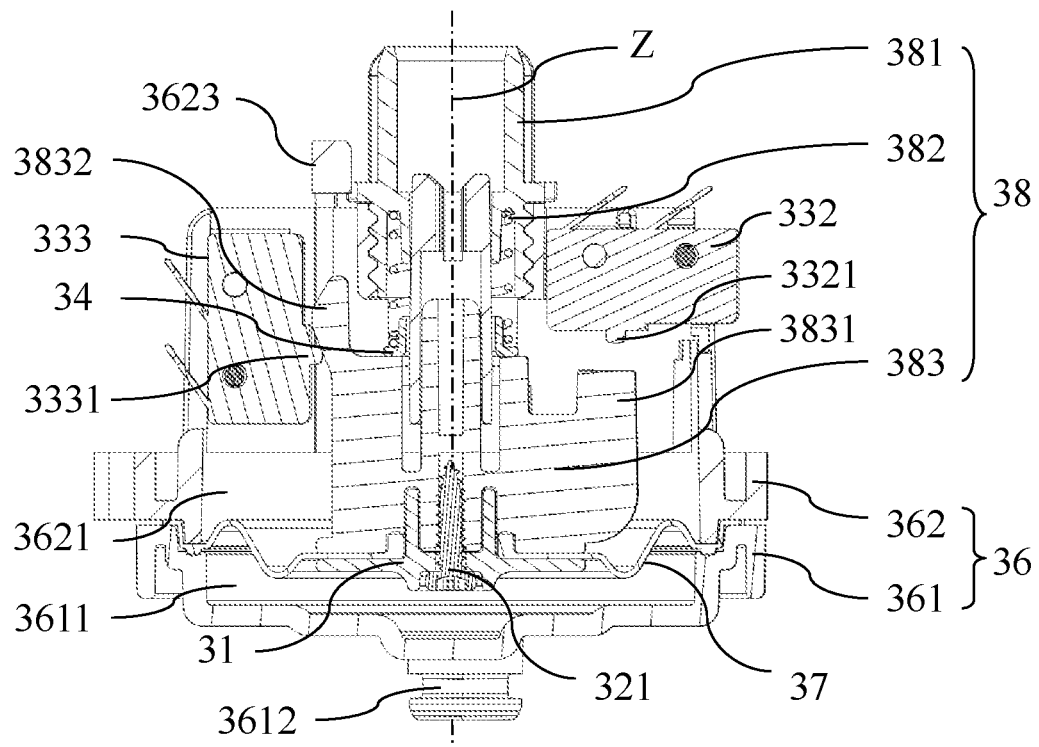
FIG. 14 is a cross-sectional view of the air pressure adjustment assembly of FIG. 11.
Figure 15:
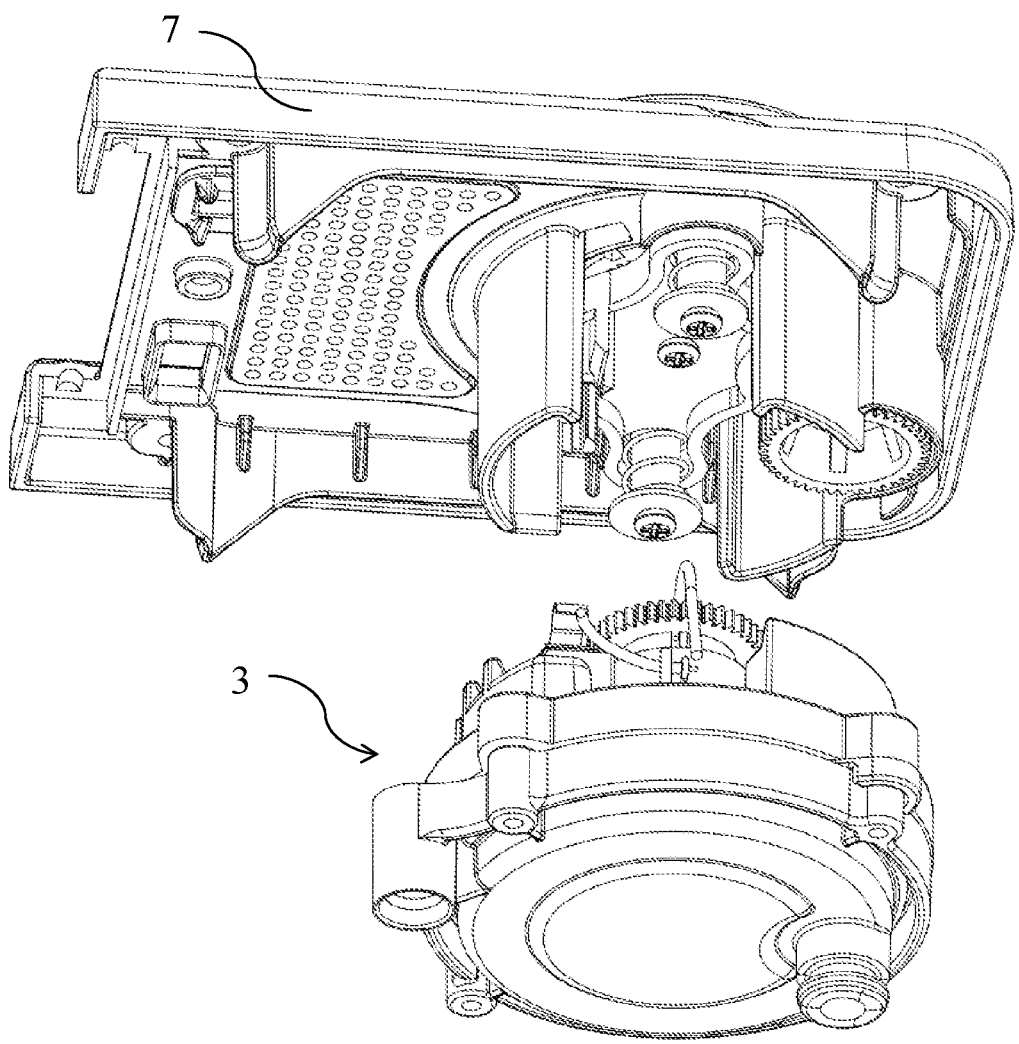
FIG. 15 is a schematic diagram of connection between an air pressure adjustment assembly and a panel of the built-in air pump assembly of FIG. 1 according to an example embodiment.
Figure 16:
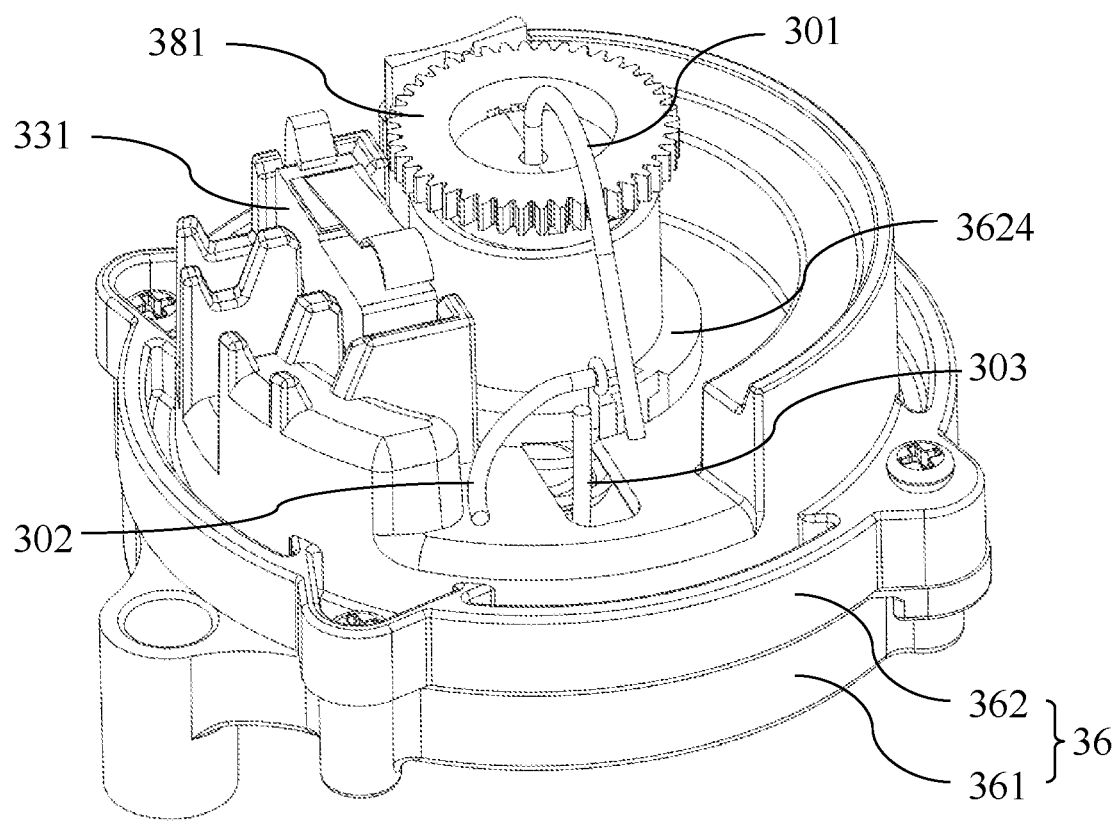
FIG. 16 is a perspective view of the air pressure adjustment assembly of FIG. 15.

As shown in FIG. 14, the air pressure adjustment assembly 3 further comprises a switch assembly 33 fixedly arranged on the housing 36. The switch assembly 33 comprises a start switch 331 and at least one stop switch which is configured for stopping the main air pump 1. The linkage component 383 comprises at least one contact that matches the stop switch. According to the change in internal air pressure of the inflatable product, the linkage component 383 moves correspondingly with the at least one contact and triggers the corresponding stop switch by each contact. For example, the at least one stop switch comprises a first stop switch 332 and a second stop switch 333.

The first stop switch 332 is provided with a first contact point 3321, and the second stop switch 333 is provided with a second contact point 3331. The linkage component 383 is provided with a first contact 3831 and a second contact 3832. When the built-in air pump assembly 100 is in operation, the change in internal air pressure of the inflatable product allows the flexible board 37 and the linkage component 383 to move along the axis Z. If the linkage component 383 reaches a specific position along the axis Z, the contact of the linkage component 383 may be in contact with the contact point of the first stop switch 332 or the second stop switch 333 to activate the first stop switch 332 or the second stop switch 333 and to send corresponding control signals. Rotation of the positioning component 381 can change the internal air pressure of the inflatable product required for activating the first stop switch 332 or the second stop switch 333. The first contact 3831 of the linkage component 383 may be aligned with the first contact point 3321 of the first stop switch 332 in the moving direction of the linkage component 383, i.e., aligned in the direction parallel to the axis Z, so that the linkage component 383 can accurately trigger the first stop switch 332. Similarly, the second contact 3832 of the linkage component 383 may also be aligned with the second contact point 3331 of the second stop switch 333 in the direction parallel to the axis Z, so that the linkage component 383 can accurately trigger the second stop switch 333.

For the first stop switch 332, when the inflatable product is inflated until the internal air pressure reaches a preset value, in the orientation shown in the figure, the first contact 3831 of the linkage component 383 rises to be in contact with the first contact point 3321 of the first stop switch 332, and the central control unit 5 controls, upon detecting an electrical signal sent by the first stop switch 332, the air pumps to stop refilling/inflating. When triggered for the first time, the central control unit 5 controls the main air pump 1 to stop inflating, and when subsequently triggered (for example, after the air pressure in the inflatable product drops, or the air pressure has already reached a target air pressure when power is just turned on), the central control unit 5 controls the air replenishing pump 2 to stop refilling.

For the second stop switch 333, when the internal air pressure gradually drops as the inflatable product is deflated, in the orientation shown in the figure, the second contact 3832 of the linkage component 383 correspondingly gradually descends to be in contact with the second contact point 3331 of the second stop switch 333, and the central control unit 5 controls, upon detecting an electrical signal sent by the second stop switch 333, the main air pump 1 to stop deflating.

Example working states of the central control unit 5 are listed as below:

a1. detecting in real time whether the first stop switch 332 is closed when the main air pump 1 is working to inflate the inflatable product; and determining, if the first stop switch 332 is closed, that inflation of the inflatable product is finished, and switching off the main air pump 1 to stop inflating the inflatable product;

b1. Standing by after the main air pump 1 finishes inflating the inflatable product, and detecting, at preset time intervals, whether the first stop switch 332 is open; determining, if the first stop switch 332 is open, that the inflatable product is under pressure, and initiating the air replenishing pump 2 to refill the inflatable product;

c1. Detecting, in real time, whether the first stop switch 332 is closed when the air replenishing pump 2 is working to inflate the inflatable product; and determining, if the first stop switch 332 is closed, that refilling of the inflatable product is finished, and switching off the air replenishing pump 2 to stop refilling the inflatable product; and d1. Detecting, in real time, whether the second stop switch 333 is closed when the main air pump 1 is working to deflate the inflatable product; and determining, if the second stop switch 333 is closed, that deflation of the inflatable product is finished, and switching off the main air pump 1 to stop deflating the inflatable product.

The central control unit 5 can switch between the above-mentioned states b1 and c1 when the inflatable product is in a normal use state.

Furthermore, a washer 34 is may be arranged between the elastic member 382 and the linkage component 383 for isolating the lower end of the elastic member 382 from the linkage component 383 to prevent the elastic member 382 from getting stuck between the positioning component 381 and the linkage component 383 and thus to avoid unsmooth rotation. The elastic member 382 may be a coil spring compressed between the positioning component 381 and the linkage component 383.

It can be understood that the second stop switch 333 and the second contact 3832 are optional. In other words, in other example embodiments, the central control unit 5 only detects whether refilling or inflation of the inflatable product is finished, and controls, if refilling or inflation is finished, the built-in air pump assembly 100 to stop refilling or inflating the inflatable product. Accordingly, the central control unit 5 may not be in the working state d1 described above.

FIGS. 15 to 18c show another example embodiment of the air pressure adjustment assembly 3.

Figure 17:
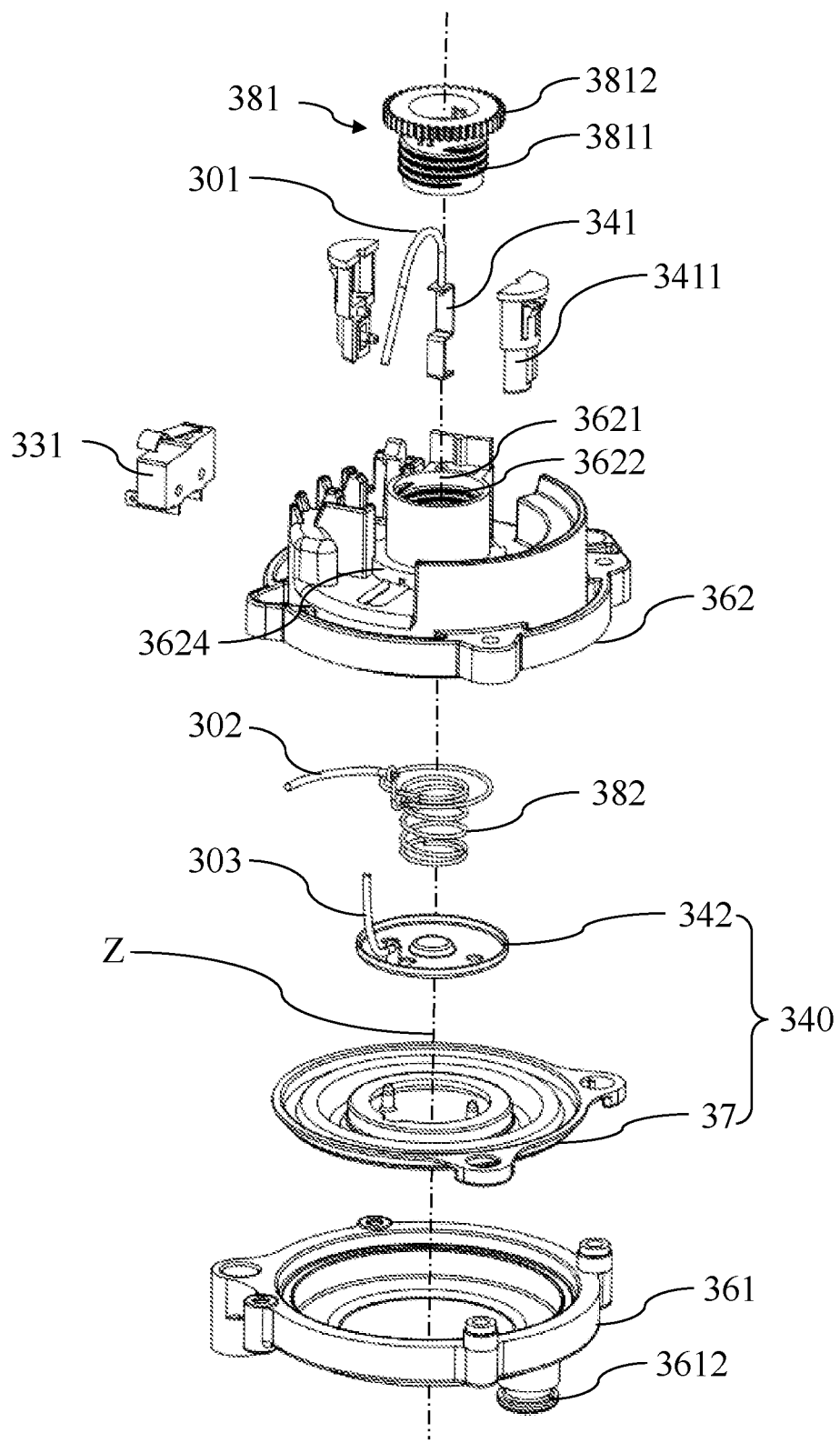
FIG. 17 is an exploded view of the air pressure adjustment assembly of FIG. 15.

As shown in FIG. 17, compared with an above-described embodiment of the air pressure adjustment assembly 3, the air pressure adjustment assembly 3 according to this example embodiment comprises a first wire 301, a second wire 302, and a third wire 303. The elastic member 382 is electrically conductive. The air pressure adjustment assembly 3 comprises a flexible dividing assembly 340. A part of the flexible dividing assembly 340 (for example, a periphery thereof) is sandwiched between the first housing 361 and the second housing 362 and correspondingly forms a seal. The flexible dividing assembly 340 divides the internal space of the housing 36 into a first chamber 3611 and a second chamber 3621. The first chamber 3611 is in fluid communication with the inside of the inflatable product via the air intake pipe 3612, and the second chamber 3621 is in fluid communication with the outside of the inflatable product. The adjusting device further comprises a first conductive element 341, the first conductive element 341 being arranged on the side of the second chamber 3621 relative to the flexible dividing assembly 340. The upper end of the first conductive element 341 and the upper end of the elastic member 382 are respectively fixed to the positioning component 381. The lower end of the first conductive element 341 is disconnected from or in electrical communication with the flexible dividing assembly 340.

The flexible dividing assembly 340 is configured to: electrically connect the elastic member 382 to the first conductive element 341 when the flexible dividing assembly 340 is in contact with both of the elastic member 382 and the first conductive element 341. The distance between one end of the elastic member 382 and the flexible dividing assembly 340 is smaller than the distance between the first conductive element 341 and the flexible dividing assembly 340 when the elastic member 382 freely extends.

The driving device 4 is configured to adjust the distance between the positioning component 381 and the flexible dividing assembly 340.

The flexible dividing assembly 340 may comprise a flexible board 37 and a second conductive element 342. The second conductive element 342 is attached to a side, facing the first conductive element 341, of the flexible board 37. Alternatively, the second conductive element 342 may be embedded onto the flexible board 37. The first wire 301 is connected to the first conductive element 341, the second wire 302 is connected to the elastic member 382, and the third wire 303 is connected to the second conductive element 342. The first conductive element 341, the second conductive element 342 and the elastic member 382 may each be made from a material (for example, metal) with excellent electrical conductivity, such as copper, aluminum, nickel, cadmium, silver or an alloy thereof. In order to make the first conductive element 341, the second conductive element 342, and the elastic member 382 achieve required mechanical properties, they may be made from different materials. The first conductive element 341 and the elastic member 382 are in contact with or separated from the second conductive element 342 according to a change in internal air pressure of the inflatable product, such that the first wire 301 and the second wire 302 are electrically connected with or disconnected from the third wire 303, respectively. The central control unit 5 determines the current state of the inflatable product according to these electrical connections and disconnections and may generate corresponding control signals. The first conductive element 341 may be a metal sheet fixed to (for example, at least partially embedded into) the positioning component 381, the second conductive element 342 may be a metal plate or block, and the elastic member 382 may be fixedly arranged on the second housing 362. The first conductive element 341 moves along with the positioning component 381, so that the distance between the first conductive element 341 and the flexible dividing assembly 340 (and the second conductive element 342) can be adjusted by means of the driving device 4. The further the first conductive element 341 is from the second conductive element 342, the greater the compression of the elastic member 382 is required to bring the first conductive element 341 and the second conductive element 342 into contact and to stop inflating the inflatable product. In this way, the driving device 4 may be configured to adjust the preset inflation air pressure of the inflatable product.

It can be understood that according to one or more alternate example embodiments, the first conductive element 341 and the elastic member 382 may be mounted in a manner different from that described above. In the orientation of FIG. 17, the upper end of the elastic member 382 is fixed to (for example, at least partially embedded into) the positioning component 381, while the first conductive element 341 is fixed to the second housing 362. The further the upper end of the elastic member 382 is from the second conductive element 342, the greater the compression of the elastic member 382 is required to bring the first conductive element 341 and the second conductive element 342 into contact and to stop inflating the inflatable product. In this way, the driving device 4 may be configured to adjust the preset inflation air pressure of the inflatable product.

Similarly, it can be understood that according to one or more alternate example embodiments, the flexible dividing assembly 340 may comprise a flexible board 37 that is electrically conductive. The electrically conductive flexible board 37 is made of a material with good electrical conductivity (for example, metal, or silicone rubber doped with an electrically conductive material). Accordingly, the second conductive element 342 may be omitted. This example embodiment differs from the previous example embodiment in that the third wire 303 is connected to the electrically conductive flexible board 37. The first conductive element 341 and the elastic member 382 are in contact with or separated from the electrically conductive flexible board 37, according to the change in the internal air pressure of the inflatable product, so that the first wire 301 and the second wire 302 are electrically connected with or disconnected from the third wire 303.

Figure 18A:
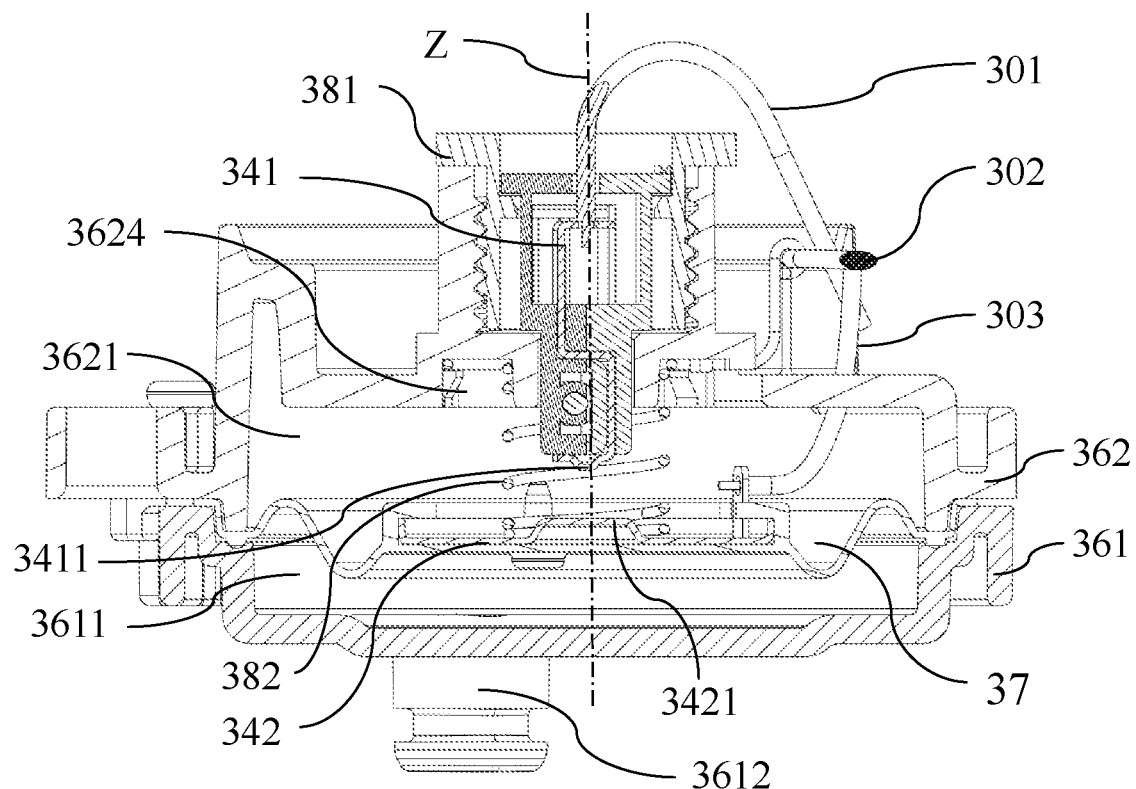
FIG. 18a is a cross-sectional view of the air pressure adjustment assembly of FIG. 15 in an inflated or deflated state.
Figure 18B:
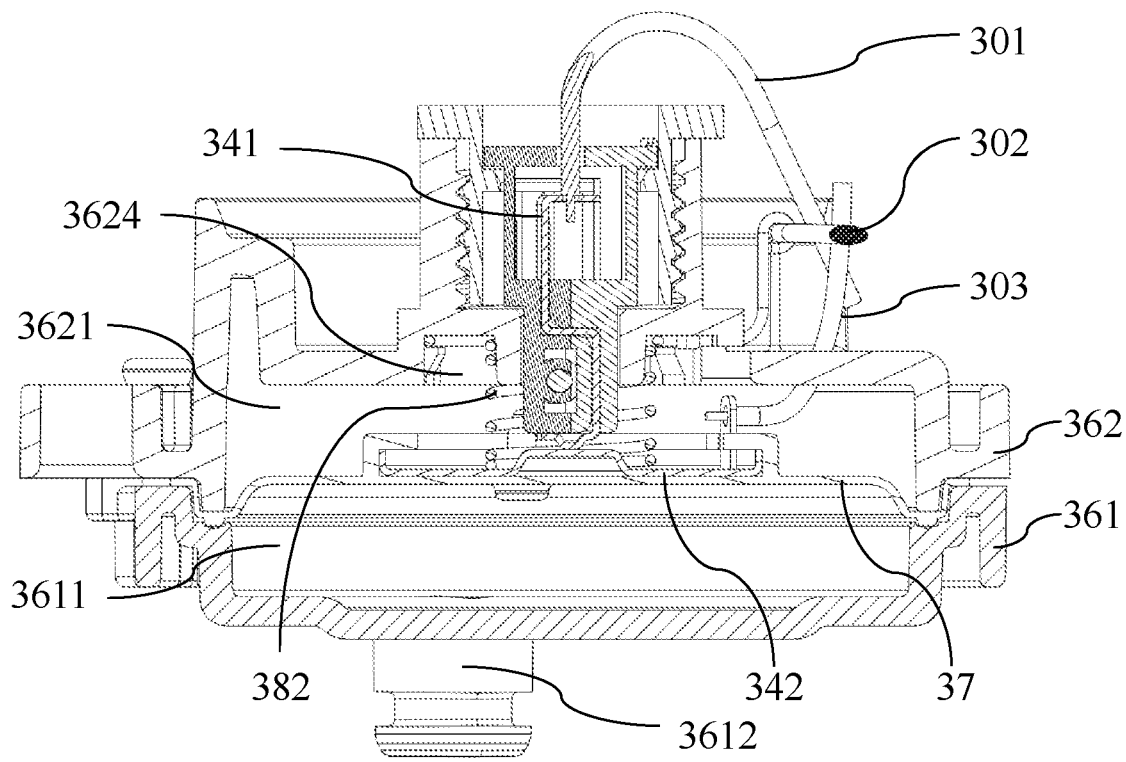
FIG. 18b is a cross-sectional view of the air pressure adjustment assembly of FIG. 15 in a completely inflated state.
Figure 18C:
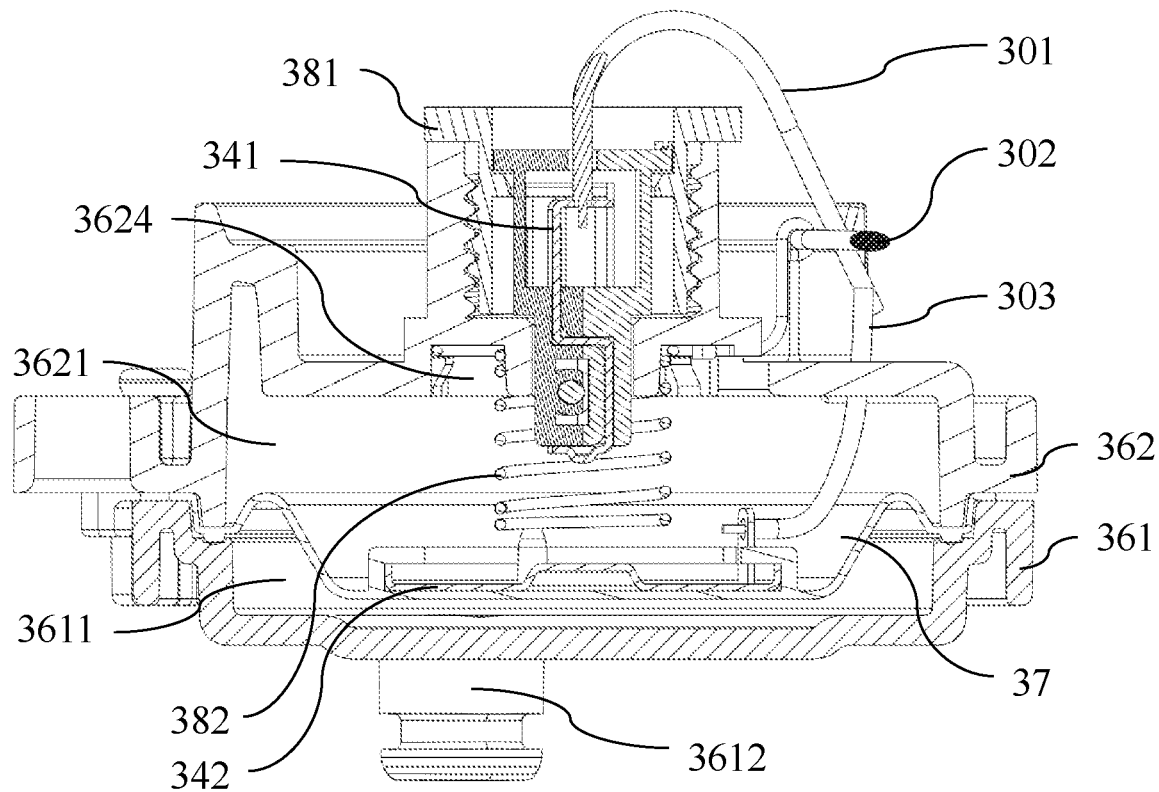
FIG. 18c is a cross-sectional view of the air pressure adjustment assembly of FIG. 15 in a completely deflated state.

As shown in FIGS. 18a to 18c, for example, the flexible dividing assembly 340 comprises the flexible board 37 and the second conductive element 342. The first conductive element 341 is snapped into the positioning component 381 by a connecting member 3411 and moves vertically with the positioning component 381. A boss 3624 is provided at the bottom of the second housing 362, the upper end of the elastic member 382 being snapped on and fixed to the boss 3624. The first conductive element 341 may be provided with a first contact point 3411 near the second conductive element 342, while the second conductive element 342 may be provided with a second contact point 3421 near the first conductive element 341. The change in the internal air pressure of the inflatable product causes the flexible board 37 and the second conductive element 342 to move along the axis Z. Accordingly, the second conductive element 342 may:

(1) be separated from both of the elastic member 382 and the first conductive element 341, such that the second wire 302 and the third wire 303 are disconnected and the first wire 301 and the third wire 303 are disconnected;

(2) be in contact with the elastic member 382 but separated from the first conductive element 341, such that the second wire 302 and the third wire 303 are electrically connected but the first wire 301 and the third wire 303 are disconnected; or (3) be in contact with both of the elastic member 382 and the first conductive element 341, such that the third wire 303 is electrically connected with the first wire 301 and the second wire 302, wherein the first conductive element 341 and the second conductive element 342 are electrically connected by the contact between the first contact point 3411 and the second contact point 3421 described above.

It can be understood that when the flexible dividing assembly 340 comprises the electrically conductive flexible board 37, accordingly, the change in the internal air pressure of the inflatable product causes the flexible board 37 to move along the axis Z. The electrically conductive flexible board 37 may:

(1) be separated from both of the elastic member 382 and the first conductive element 341, such that the second wire 302 and the third wire 303 are disconnected and the first wire 301 and the third wire 303 are disconnected;

(2) be in contact with the elastic member 382 but separated from the first conductive element 341, such that the second wire 302 and the third wire 303 are electrically connected but the first wire 301 and the third wire 303 are disconnected; or (3) be in contact with both of the elastic member 382 and the first conductive element 341, such that the third wire 303 is electrically connected with the first wire 301 and the second wire 302.

The central control unit 5 detects the electrical connections and disconnections between the third wire 303 and the first wire 301 and the second wire 302, and sends corresponding control signals to the main air pump 1 according to these electrical connections and disconnections to control the main air pump 1 to work or stop. For ease of understanding, example working states of the central control unit 5 are listed as below:

a2. Detecting in real time whether the first wire 301 and the third wire 303 are electrically connected when the main air pump 1 works to inflate the inflatable product; and determining, if the first wire 301 and the third wire 303 are electrically connected, that inflation of the inflatable product is finished, and switching off the main air pump 1 to stop inflating the inflatable product;

b2. Standing by after the main air pump 1 finishes inflating the inflatable product, and detecting at preset time intervals whether the first wire 301 and the third wire 303 are electrically connected; and determining, if the first wire 301 and the third wire 303 are not electrically connected, that the inflatable product is under pressure, and switching on the air replenishing pump 2 to refill the inflatable product;

c2. Detecting in real time whether the first wire 301 and the third wire 303 are electrically connected when the air replenishing pump 2 works to inflate the inflatable product; and determining, if the first wire 301 and the third wire 303 are electrically connected, that refilling of the inflatable product is finished, and switching off the air replenishing pump 2 to stop refilling the inflatable product; and d2. Detecting in real time whether the second wire 302 and the third wire 303 are electrically connected when the main air pump 1 works to deflate the inflatable product; and determining, if the second wire 302 and the third wire 303 are not electrically connected, that deflation of the inflatable product is finished, and switching off the main air pump 1 to stop deflating the inflatable product.

The central control unit 5 can switch between the above-mentioned state b2 and state c2 when the inflatable product is in a normal use state.

It can be understood that according to one or more alternate example embodiments, one of the first contact point 3411 and the second contact point 3421 may be omitted, or both of the first contact point 3411 and the second contact point 3421 may be omitted.

An example process in which the central control unit 5 controls the working state of the main air pump is described below.

Referring to FIG. 18a, when the built-in air pump assembly 100 is in an inflation state, the first conductive element 341 and the flexible dividing assembly 340 are separated, and the elastic member 382 and the flexible dividing assembly 340 are either in contact with or separated from each other. For example, when the user just takes out the inflatable product from a product package, there is almost no air in the air chamber of the inflatable product. The air pressure difference between two sides of the flexible board 37 allows the flexible dividing assembly 340 to be away from the first conductive element 341, and the flexible dividing assembly 340 is separated from the elastic member 382. For example, when the inflatable product has been inflated with a certain amount of air, the flexible dividing assembly 340 and the first conductive element 341 are separated by the air pressure difference between the two sides of the flexible board 37, but the flexible dividing assembly 340 is in contact with the elastic member 382.

Regardless of whether the elastic member 382 and the flexible dividing assembly 340 are in contact with or separated from each other when the built-in air pump assembly 100 enters the inflation state, the flexible dividing assembly 340 moves toward the first conductive element 341 as the air pressure inside the inflatable product increases. When the flexible dividing assembly 340 is finally in contact with both of the first conductive element 341 and the elastic member 382, the first wire 301 and the second wire 302 are electrically connected with the third wire 303, as shown in FIG. 18b. The central control unit 5 determines that inflation of the inflatable product is finished, and controls the main air pump 1 to stop.

Still referring to FIG. 18a, if the built-in air pump assembly 100 is in a deflation state, the first conductive element 341 is separated from the flexible dividing assembly 340, while the elastic member 382 and the flexible dividing assembly 340 are either in contact with or separated from each other. As the air pressure inside the inflatable product decreases, the flexible dividing assembly 340 moves away from the first conductive element 341. When the flexible dividing assembly 340 is finally separated from both of the first conductive element 341 and the elastic member 382, the first wire 301 and the second wire 302 are both disconnected from the third wire 303, as shown in FIG. 18c. The central control unit 5 determines that deflation of the inflatable product is finished, and controls the main air pump 1 to stop.

It can be understood that the second wire 302 described above may be optional. In other words, according to one or more other example embodiments, the central control unit 5 may only detect whether refilling or inflation of the inflatable product is finished, and control, if refilling or inflation is finished, the built-in air pump assembly 100 to stop refilling or inflating the inflatable product. Accordingly, the elastic member 382 may be either electrically conductive or insulating, while the central control unit 5 may not be in the above-mentioned working state d2.

Figure 19:
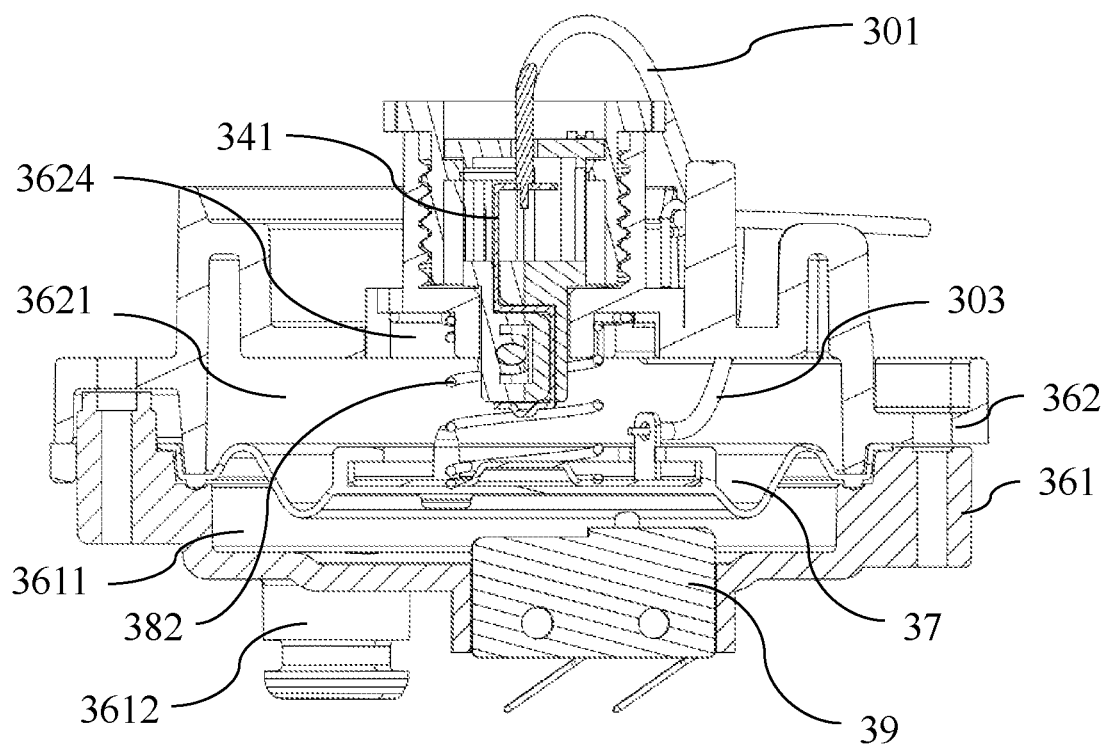
FIG. 19 is a cross-sectional view of the air pressure adjustment assembly of FIG. 15 in an inflated or deflated state according to another example embodiment.

FIG. 19 illustrates another example embodiment of the air pressure adjustment assembly 3. The air pressure adjustment assembly 3 may further comprise a microswitch 39 for indicating completion of deflation of the inflatable product, the microswitch 39 being electrically connected to the central control unit 5. When deflation of the inflatable product is finished and the air pressure inside the inflatable product drops, the air pressure inside the first chamber 3611 drops synchronously, and the flexible board 37 moves toward the first housing 361 under the action of the elastic member 382 to trigger the microswitch 39. Upon detecting that the microswitch 39 is triggered, the central control unit 5 controls the main air pump 1 to stop. It can be understood that the microswitch 39 described above is optional. In other words, according to one or more alternate example embodiments, the central control unit 5 only detects whether refilling or inflation of the inflatable product is finished, and controls, if refilling or inflation is finished, the built-in air pump assembly 100 to stop refilling or inflating the inflatable product.

FIGS. 20 to 23b illustrate an example embodiment of the driving device 4.

Figure 20:
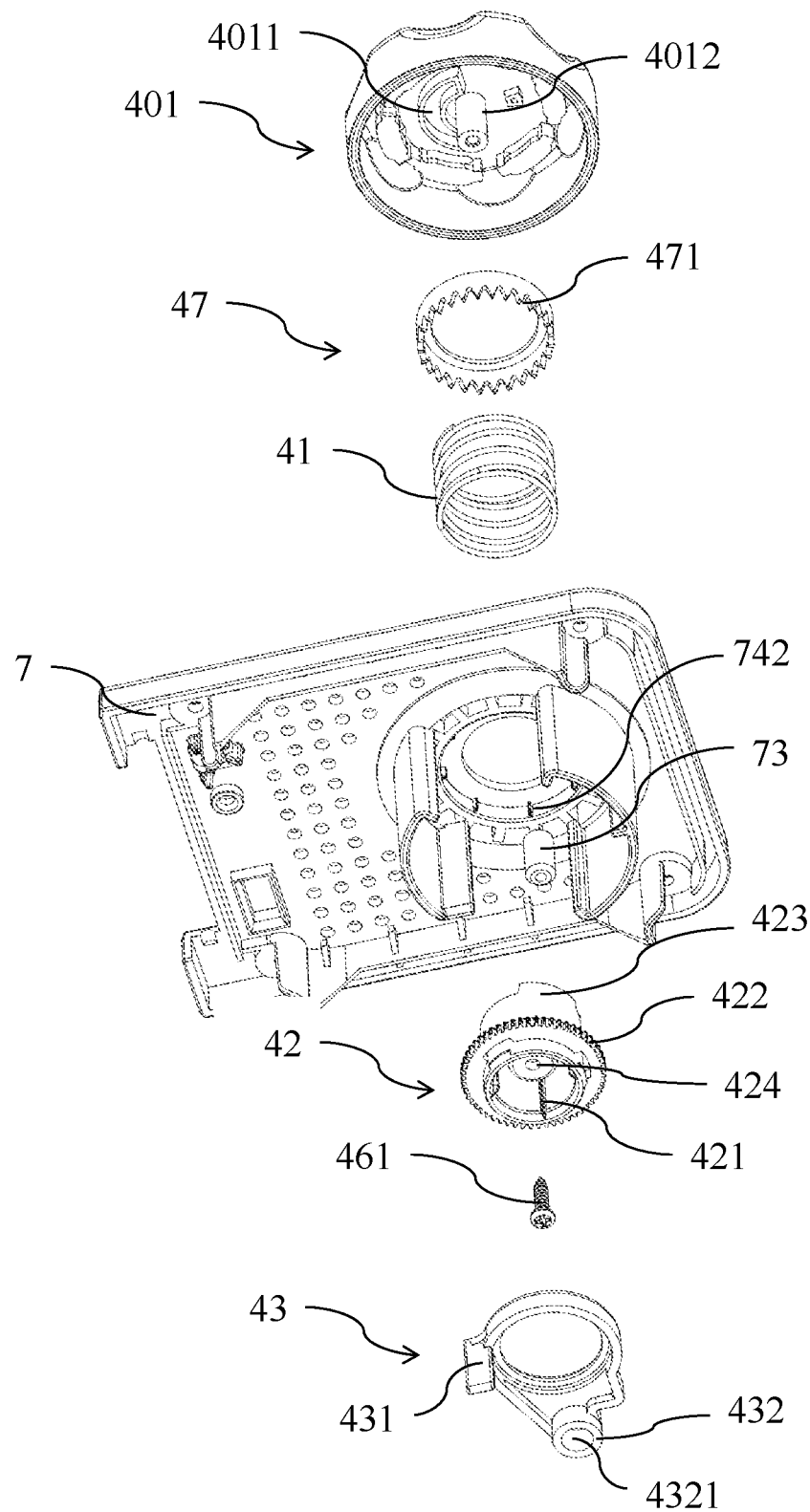
FIG. 20 is an exploded view of connection between a driving device and a panel of the built-in air pump assembly of FIG. 1 according to an example embodiment.

As shown in FIG. 20, the driving device 4 comprises: a knob 401, a first reset spring 41, a transmission component 42, and a start switch triggering element 43. The knob 401 is coupled to the positioning component 381 and is configured to drive the positioning component 381 to rotate axially, and the knob 401 is axially movably arranged on the panel 7 to trigger the start switch 331 for initiating the air pump to inflate or deflate the inflatable product. By means of moving the knob 401 to a preset position, the start switch 331 for initiating the main air pump 1 is triggered.

The first reset spring 41, with the upper end abutting against a lower surface of the knob 401 and the lower end abutting against an upper surface of the panel 7, is arranged between the knob 401 and the panel 7.

Figure 21:
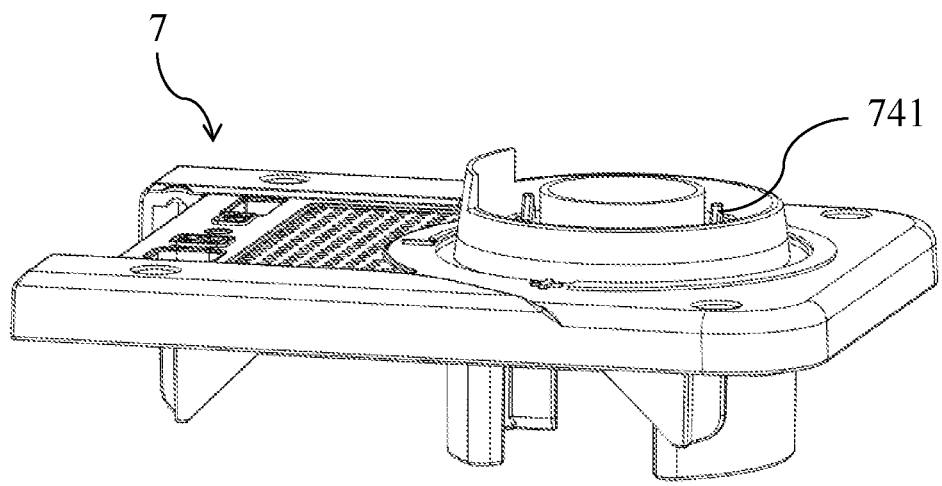
FIG. 21 is a perspective view of the panel of the driving device of FIG. 20.
Figure 22A:
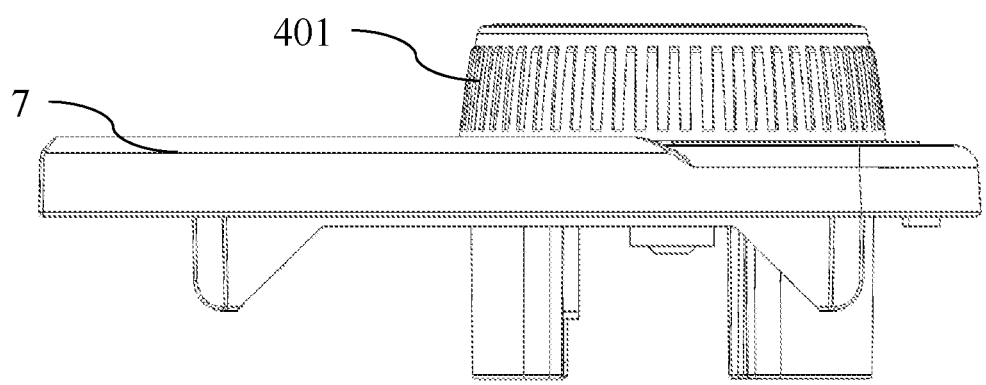
FIG. 22a is a front view of the driving device of FIG. 20 with a knob pressed down.
Figure 22B:
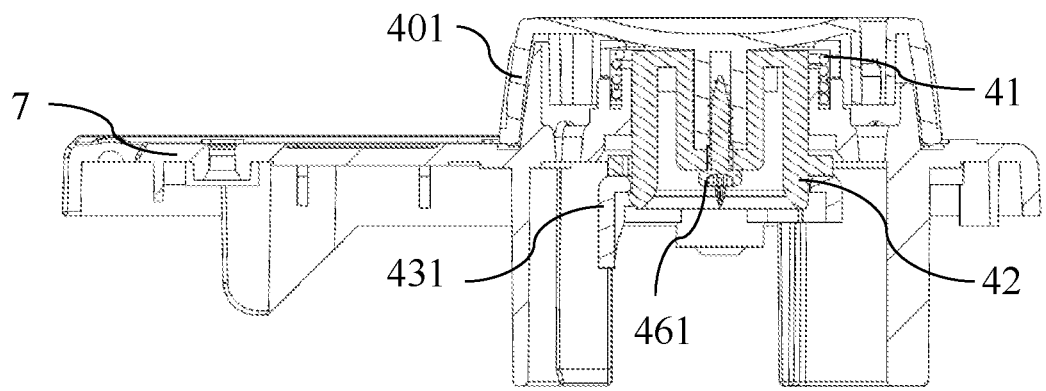
FIG. 22b is a cross-sectional view of the driving device of FIG. 20 with a knob pressed down.
Figure 23A:
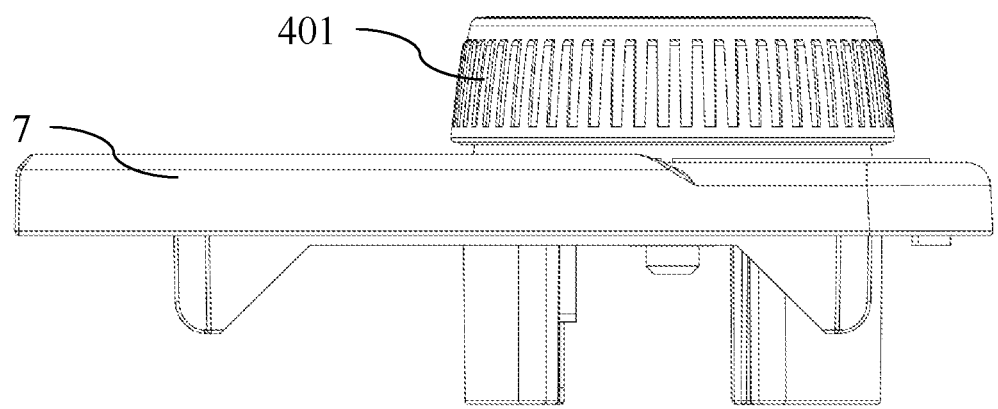
FIG. 23a is a front view of the driving device of FIG. 20 with a knob popped up.
Figure 23B:
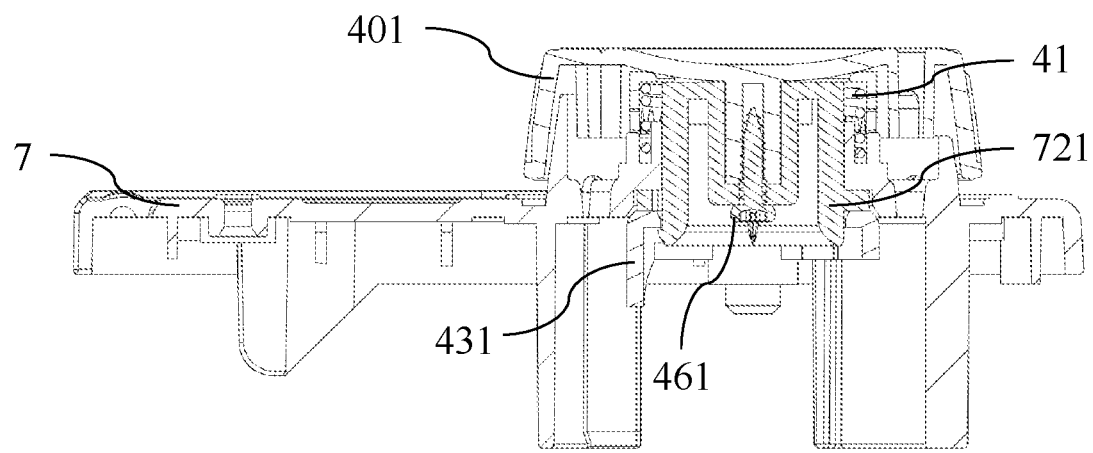
FIG. 23b is a cross-sectional view of the driving device of FIG. 20 with a knob popped up.
Figure 24:
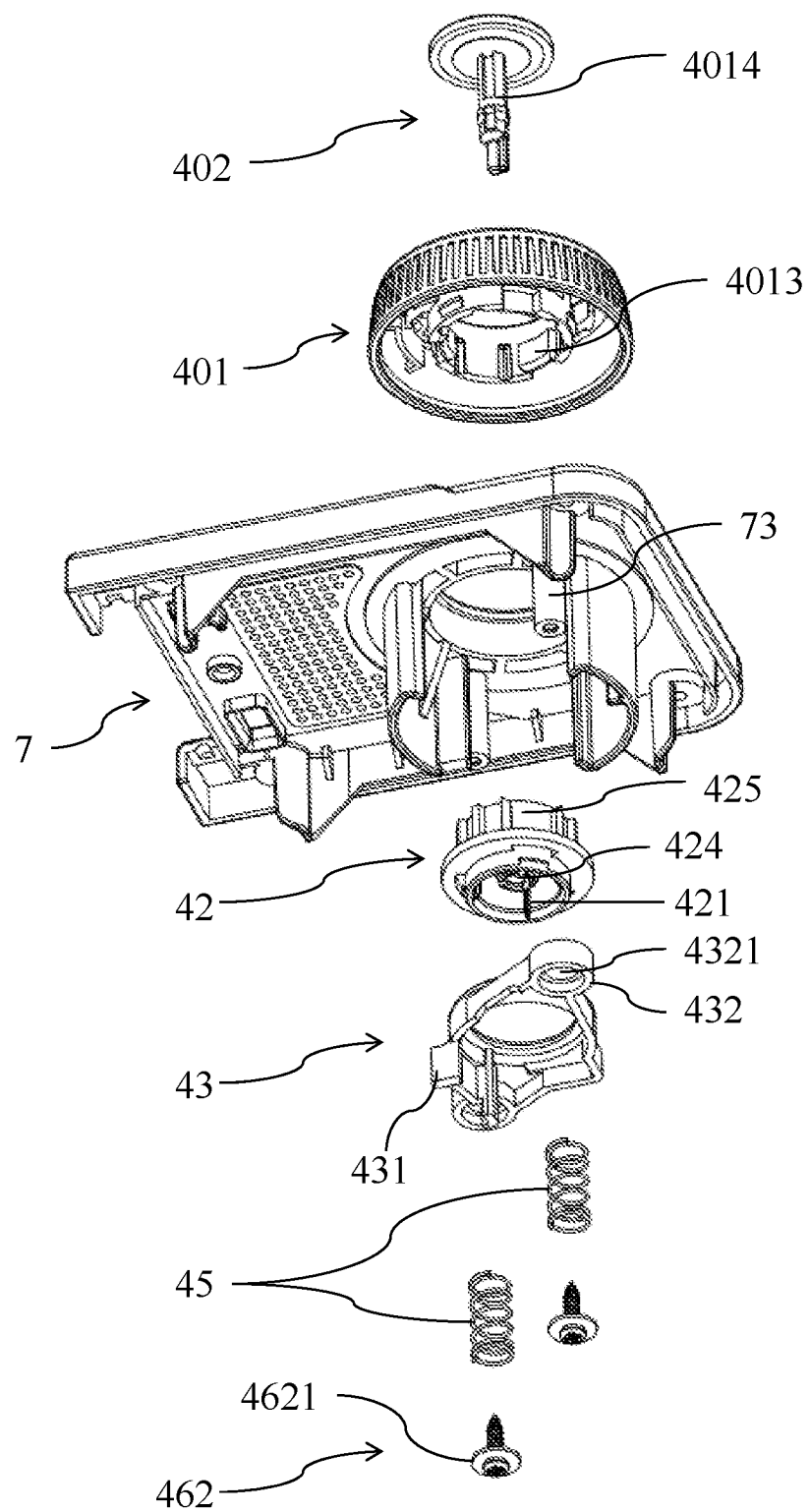
FIG. 24 is an exploded view of connection between a driving device and a panel of the built-in air pump assembly of FIG. 1 according to an example embodiment.
Figure 25:
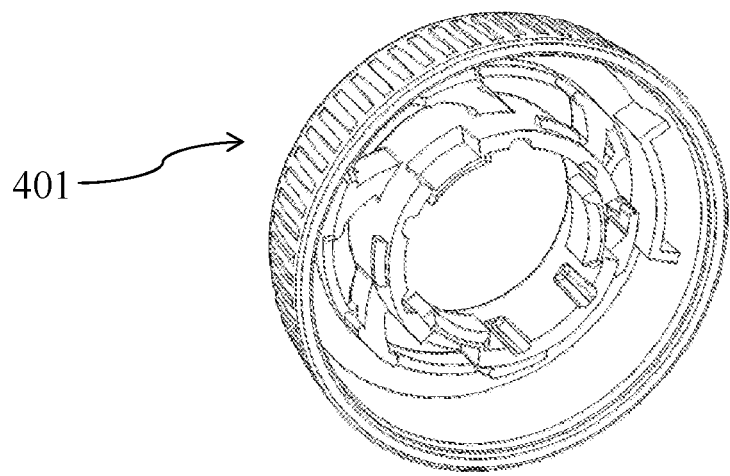
FIG. 25 is a perspective view of a knob of the driving device of FIG. 24.
Figure 26:
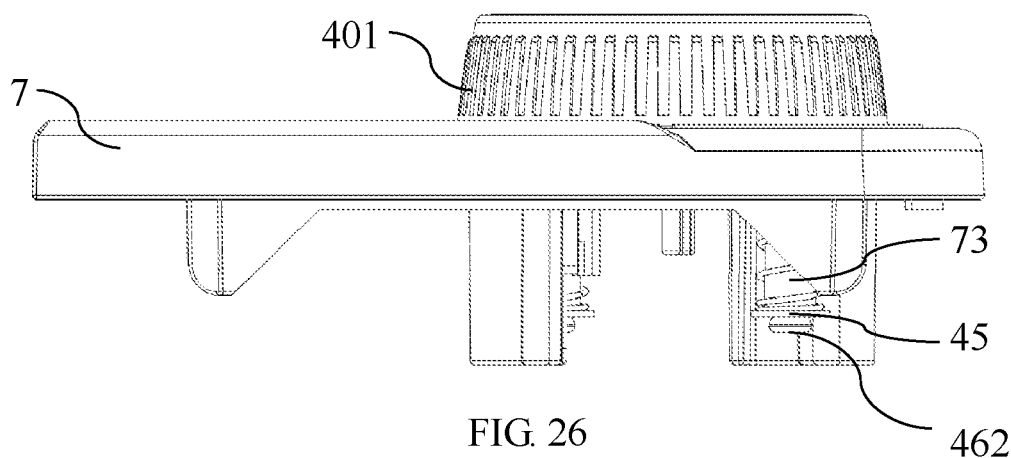
FIG. 26 is a front view of the connection between the driving device and the panel of FIG. 24.
Figure 27A:
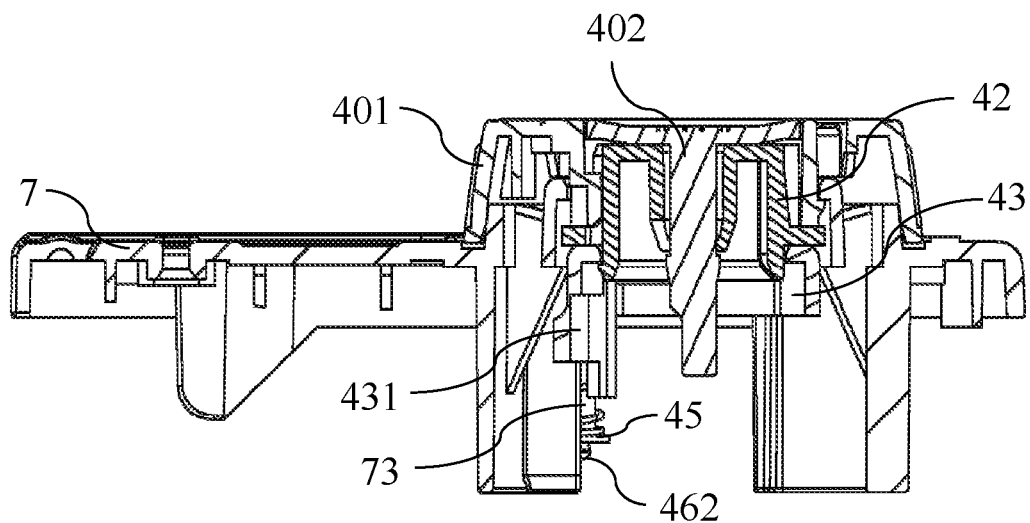
FIG. 27a is a cross-sectional view of the driving device of FIG. 24 with a button popped up.
Figure 27B:
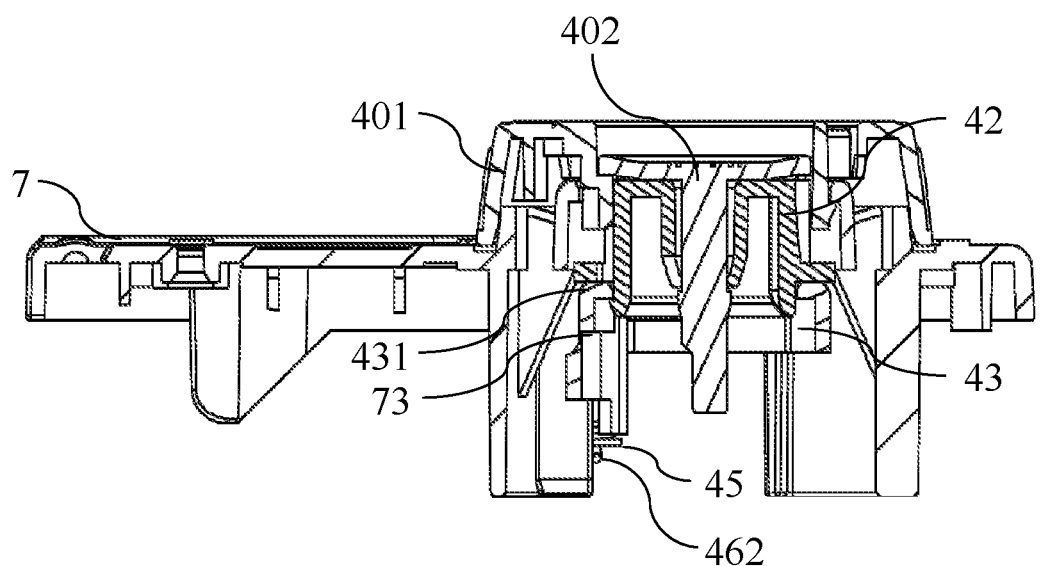
FIG. 27b is a cross-sectional view of the driving device of FIG. 24 with a button pressed down.

As shown in FIGS. 20 and 21, the lower surface of the knob 401 is provided with an arc-shaped groove 4011, and the upper end of the transmission component 42 is provided with an arc-shaped bulge 423 that matches the arc-shaped groove 4011, so that the arc-shaped bulge 423 may be snapped into the arc-shaped groove 4011. The lower surface of the knob 401 is further provided with a first connecting shaft 4012, the transmission component 42 is further provided with a shaft cavity 424 that matches the first connecting shaft 4012, and the first connecting shaft 4012 penetrates the shaft cavity 424 and is fixed by a first screw 461. Thus, the transmission component 42 is coaxially and fixedly connected to the knob 401 and rotates synchronously with the knob 401. The upper end of the transmission component 42 is nested in the first reset spring 41.

A clamping rib 421 is further arranged on the transmission component 42, and the upper end of the positioning component 381 is provided with clamping teeth 3812 (as shown in FIG. 12) that match the clamping rib 421, so that the positioning component 381 can rotate synchronously with the transmission component 42.

The start switch triggering element 43 abuts beneath the transmission component 42 and comprises a limit groove 432 provided with a through hole 4321. A lower surface of the panel 7 is provided with a downwardly extending guide post 73, and the through hole 4321 matches the guide post 73 such that at least a portion of the panel 7 is sleeved around the start switch triggering element 43, and the start switch triggering element 43 can move axially along the guide post 73. The start switch triggering element 43 is further provided with a bulge 431, the bulge 431 being configured to trigger the start switch 331 of the air pressure adjustment assembly 3.

When the knob 401 is pressed down, the start switch triggering element 43 is pushed downwards to cause the bulge 431 to trigger the start switch 331 for starting the main air pump, at which time the first reset spring 41 is compressed. When the pressing force applied on the knob 401 disappears, the knob 401 can be restored to its initial position by the elastic force of the first reset spring 41.

The driving device 4 may further comprise a spring anti-torque gasket 47 arranged between the spring and the knob 401. The spring anti-torque gasket 47 is provided with first anti-torque teeth 471, and the upper side of the panel 7 is provided with first convex teeth 741 that match the first anti-torque teeth 471. The transmission component 42 is provided with second anti-torque teeth 422, and the lower side of the panel 7 is provided with second convex teeth 742 that match the second anti-torque teeth 422. When the transmission component 42 is not pressed down, the second anti-torque teeth 422 engage with the second convex teeth 742, so that the transmission component 42 is non-rotatable relative to the panel 7; and when the transmission component 42 is pressed down, the second anti-torque teeth 422 disengage from the second convex teeth 742, and the transmission component 42 is rotatable relative to the panel 7. At this time, the first anti-torque teeth 471 of the spring anti-torque gasket 47 engage with the first convex teeth 741, so that the spring anti-torque gasket 47 may not rotate with the knob 401 when the knob 401 rotates, and the spring anti-torque gasket 47 is fixed relative to the panel 7, thus preventing the first reset spring 41 from rotating with the knob 401 and hence avoiding affecting rotation of the knob 401 per se.

FIGS. 24 to 27b illustrate another example embodiment of the driving device 4.

The driving device 4 comprises a button 402 arranged on the knob 401, the button 402 moving toward the accommodating chamber 62 to trigger the start switch 331 for starting the air pump to inflate or deflate the inflatable product. The knob 401 is configured to be rotated to preset a pressure value of the air pump, but is axially fixed relative to the panel 7.

The knob 401 is provided with an arc-shaped bulge 4013, and an outer wall of the transmission component 42 is provided with an arc-shaped groove 425 that matches the arc-shaped bulge 4013, so that the transmission component 42 can rotate synchronously with the knob 401.

The button 402 is provided with a second connecting shaft 4014, and the transmission component 42 is provided with a shaft cavity 424 that matches the second connecting shaft 4014 to allow the second connecting shaft 4014 to penetrate the shaft cavity 424.

The driving device 4 further comprises a second reset spring 45, the second reset spring 45 being arranged between the button 402 and the panel 7 to reset the start switch triggering element 43 after the force that the button 402 applies on the start switch triggering element 43 disappears. More particularly, the panel 7 is further provided with at least one guide post 73, the number of the guide posts 73 being the same as the number of second reset springs 45. The start switch triggering element 43 abuts beneath the transmission component 42 and sleeves the corresponding guide post 73 via one or more through holes 4321 to be vertically movable along the guide post 73. Each second reset spring 45 sleeves a corresponding guide post 73 and is fixed by a second screw 462. Each second screw 462 is provided with a flange 4621 having a diameter greater than the aperture of the corresponding through hole 4321. The upper end of the second reset spring 45 abuts against a lower surface of the limit groove 432 of the start switch triggering element 43, and the lower end of the second reset spring 45 abuts against the flange 4621 of the second screw 462. In the embodiment shown in FIG. 24, the panel 7 is provided with two guide posts 73. It can be understood that according to one or more alternate example embodiments, the panel 7 may be provided with only one guide post 73 or with at least three guide posts 73.

When the button 402 is pressed down, the transmission component 42 and the start switch triggering element 43 move downwards synchronously, and the second reset spring 45 is compressed until the start switch triggering element 43 triggers the start switch 331. When the pressing force applied on the button 402 disappears, the second reset spring 45 pushes upwards the start switch triggering element 43, the transmission component 42 and the button 402 to return to their initial positions.

Figure 28:
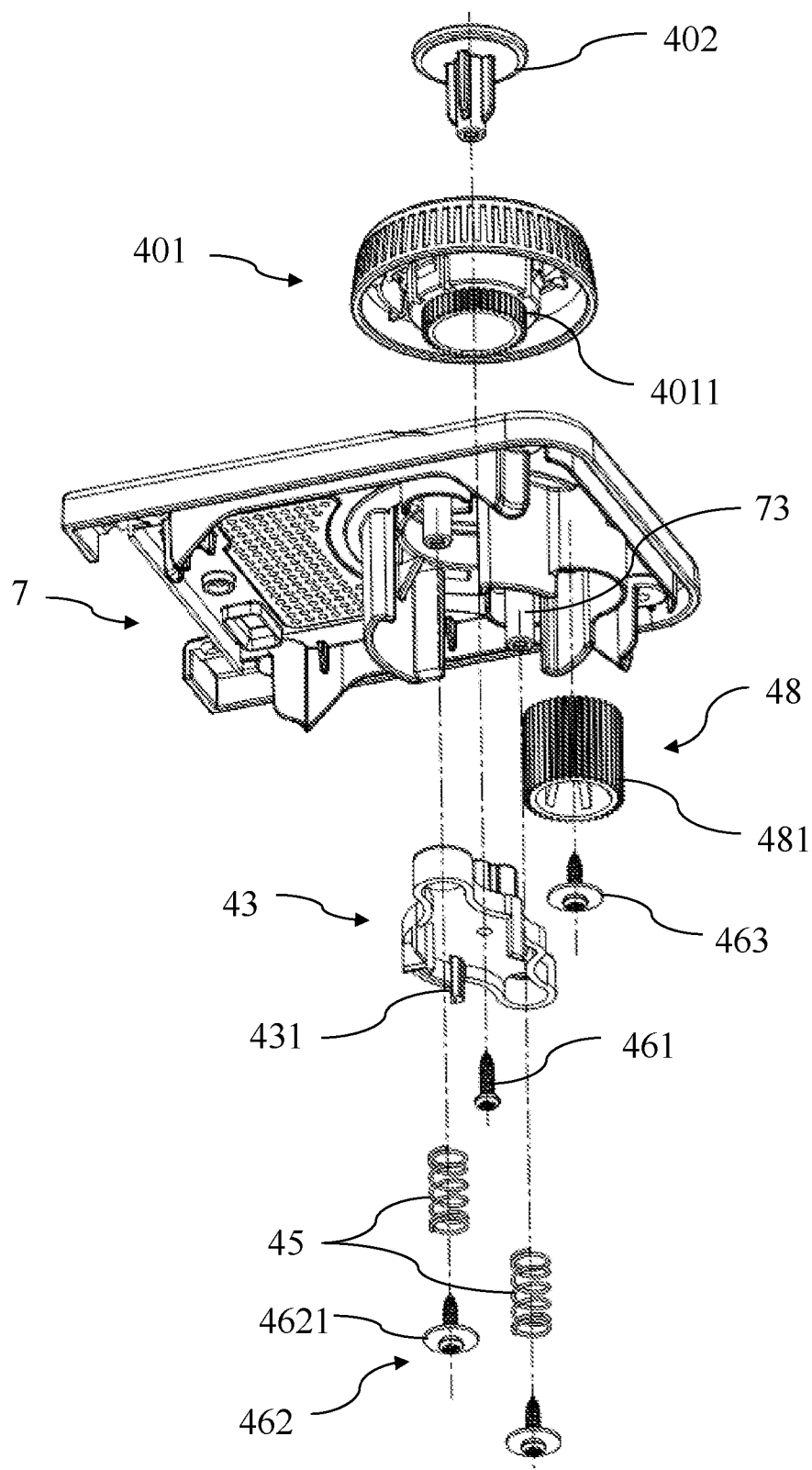
FIG. 28 is an exploded view of connection between a driving device and a panel of the built-in air pump assembly of FIG. 1 according to an example embodiment.
Figure 29A:
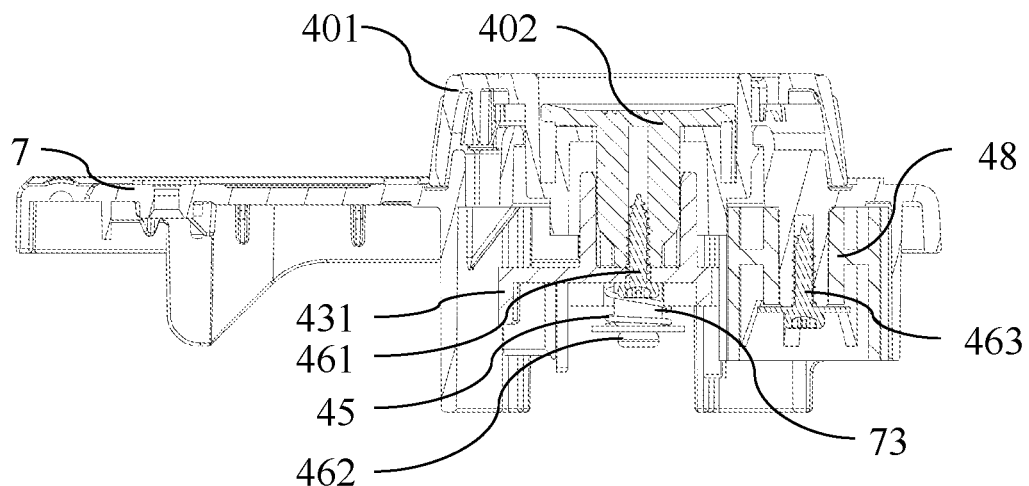
FIG. 29a is a perspective view of the driving device of FIG. 1 with a button pressed down.
Figure 29B:
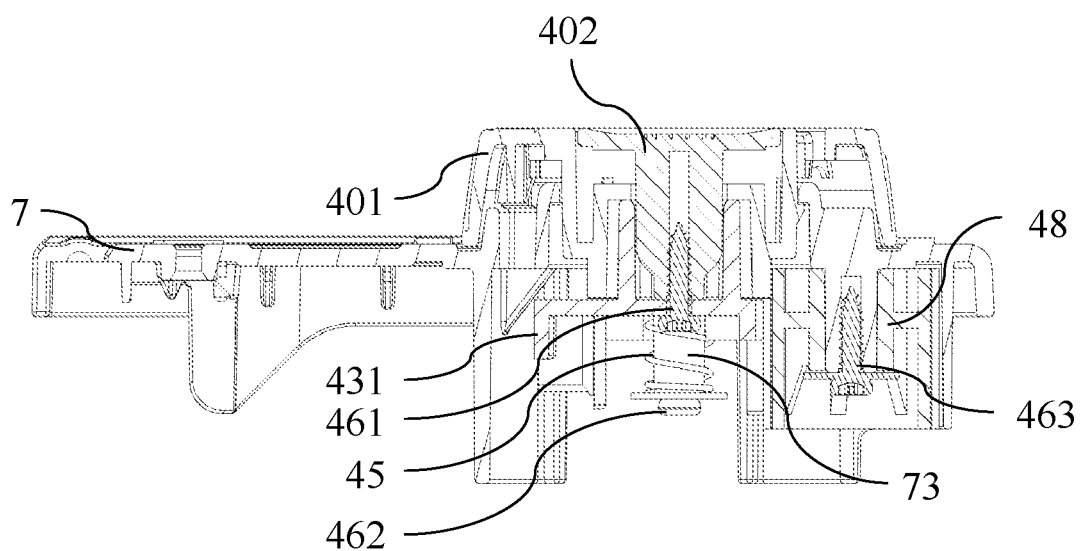
FIG. 29b is a perspective view of the driving device of FIG. 1 with a button popped up.

FIGS. 28 to 29b illustrate another example embodiment of the driving device 4.

Compared with the previously-described example embodiment of the driving device 4, the driving device 4 according to this example embodiment comprises a transmission gear 48, the transmission gear 48 being fixed to the panel 7 by a third screw 463 and being able to rotate axially relative to the third screw 463. The knob 401 is fixedly provided with first teeth 4011 distributed in the circumferential direction, and the transmission gear 48 is provided with second teeth 481 distributed in the circumferential direction. The second teeth 481 engage with the first teeth 4011 and also engage with the clamping teeth 3812 of the positioning component 381. Therefore, the knob 401 can rotate to drive the transmission gear 48 to rotate, wherein the knob 401 and the transmission gear 48 rotate in opposite directions; and on the other hand, the transmission gear 48 can rotate to drive the positioning component 381 to rotate, wherein the transmission gear 48 and the positioning component 381 rotate in opposite directions. Therefore, the knob 401 rotates to drive the positioning component 381 to rotate in the same direction. The positioning component 381 that is rotating moves axially in the threaded cavity 3621 of the housing 36 along the axis Z. In this way, the first wire 301, the second wire 302 and the third wire 303 may be conveniently extracted between the knob 401 and the positioning component 381. In other words, the knob 401 and the positioning component 381 are separated from each other and coupled by a transmission mechanism (for example, the transmission gear 48), such that the knob 401 can drive the positioning component 381 to rotate. Meanwhile, by adjusting a gear ratio of the knob 401 to the transmission gear 48 and/or a gear ratio of the transmission gear 48 to the positioning component 381, the user can make the positioning component 381 rotate for a greater or smaller number of turns by rotating the knob 401 by one turn. The transmission mechanism in the example embodiment shown in FIGS. 28 to 29b is provided with only one transmission gear 48. It can be understood, however, that according to one or more alternate example embodiments, the transmission mechanism may comprise a transmission gear set, for example, at least two transmission gears 48 constitute the transmission gear set, and the knob 401 drives, by means of the transmission gear set, the positioning component 381 to rotate. It can also be understood that the knob 401 can optionally drive, by means of other known transmission mechanisms, the positioning component 381 to rotate. For example, the transmission mechanism may comprise, but is not limited to, a pulley transmission mechanism.

When the button 402 is pressed down, the start switch triggering element 43 moves downwards synchronously, and the second reset spring 45 is compressed until the start switch triggering element 43 triggers the start switch 331. When the pressing force applied on the button 402 disappears, the second reset spring 45 pushes upwards the start switch triggering element 43, the transmission component 42 and the button 402 to return to their initial positions.

It can be understood that the built-in air pump assembly described above is applicable to a wide variety of inflatable products, so that a user can adjust, by adjusting the knob 401, the internal air pressure of the inflatable product after inflation is finished. For example, the built-in air pump assembly is applicable to, but is not limited to, an inflatable mattress, an inflatable sofa or an inflatable toy.

Figure 30:
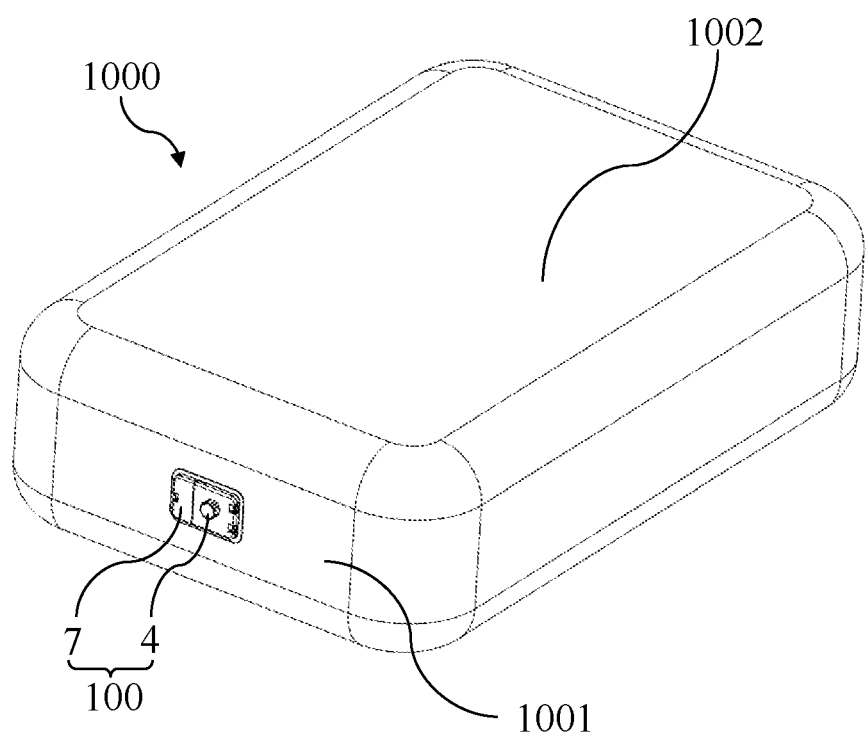
FIG. 30 is a perspective view of an inflatable mattress with a built-in air pump assembly, according to an example embodiment.

Referring to FIG. 30, taking a built-in air pump assembly 100 for an inflatable mattress 1000 as an example, the built-in air pump assembly 100 is arranged in the inflatable mattress 1000 and is in fluid communication with an inflatable chamber 1002 of the inflatable mattress 1000. A side wall 1001 of the inflatable mattress 1000 is provided with a panel 7 of the built-in air pump assembly 100. By rotating a driving device 4 on the panel 7, the user can make the built-in air pump assembly 100 suck air from the outside and inflate the inflatable chamber 1002, or make the built-in air pump assembly 100 suck a gas from the inflatable chamber 1002 and expel the gas to an external atmosphere.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An inflatable product having a built-in air pump assembly and an inflatable chamber, the built-in air pump assembly comprising:
  a casing defining an accommodating chamber;
  a main air pump disposed in the accommodating chamber;
  an air pressure adjustment assembly comprising:
    a housing disposed in the accommodating chamber;
    a flexible board dividing an interior of the housing into a first chamber in fluid communication with the inflatable chamber and a second chamber in fluid communication with an exterior of the inflatable chamber;
    an adjusting device comprising:
      a positioning component disposed in the second chamber; and
      an electrically conductive elastic member disposed between the positioning component and the flexible board, one end of the elastic member being restrained by the positioning component; and
    a driving device coupled to the positioning component and configured to drive the positioning component to move relative to the housing to thereby adjust the distance between the positioning component and the flexible board;
    a first conductive element fixed to the positioning component; and
    a second conductive element fixed to the flexible board;
  wherein the first conductive element and the elastic member are, in response to a change in an internal air pressure of the inflatable chamber, moved into contact with the second conductive element and separated from the second conductive element.

2. The inflatable product according to claim 1, further comprising:
  a panel;
  wherein the driving device comprises:
    a knob coupled to the positioning component and axially moveable with respect to the panel such that axial movement of the knob triggers a start switch configured to initiate one of inflation and deflation of the inflatable chamber; and
    a reset spring disposed between the knob and the panel and configured to axially reset the knob.

3. The inflatable product according to claim 1, further comprising:
a panel;
wherein the driving device comprises:
a knob disposed on the panel and coupled to the positioning component;
a button axially moveable with respect to the knob such that axial movement of the button triggers a start switch for initiating one of inflation and deflation of the inflatable chamber; and
a reset spring disposed between the button and the panel and configured to axially reset the button.

4. The inflatable product according to claim 2 wherein:
the adjusting device further comprises:
a linkage component disposed between the positioning component and the flexible board and abutting against the flexible board, wherein the elastic member comprises a first end abutting against the positioning component and a second end abutting against the linkage component;
the driving device further comprises a transmission component fixedly connected to the knob and comprising a clamping rib; and
the positioning component comprises clamping teeth coupled to the clamping rib.

5. The inflatable product according to claim 3, wherein:
the knob comprises first teeth; and
the driving device further comprises a transmission gear comprising second teeth coupled both to the first teeth and to the positioning component.

6. The inflatable product according to claim 2, wherein:
the adjusting device further comprises a linkage component disposed between the positioning component and the flexible board and abutting against the flexible board, wherein the elastic member comprises a first end abutting against the positioning component and a second end abutting against the linkage component;
the air pressure adjustment assembly further comprises a switch assembly fixed to the housing and comprising the start switch and at least one stop switch configured to stop one of inflating and deflating of the inflatable chamber; and
the linkage component comprises at least one contact corresponding to the stop switch, the linkage component moving correspondingly with the at least one contact according to a change in internal air pressure of the inflatable chamber and thereby configured to trigger the corresponding stop switch.

7. The inflatable product according to claim 2, wherein:
the air pressure adjustment assembly comprises:
a first wire connected to the first conductive element; and
a second wire connected to the second conductive element;
wherein the first wire is alternatively electrically connected to the second wire in response to the connectivity between the first conductive element and the second conductive element.

8. The inflatable product according to claim 1, wherein:
the adjusting device further comprises a linkage component disposed between the positioning component and the flexible board and abutting against the flexible board, wherein the elastic member comprises a first end abutting against the positioning component and a second end abutting against the linkage component;
the positioning component comprises an external thread;
the housing comprises a threaded cavity comprising an internal thread that corresponds to the external thread and thereby enables the positioning component to move axially in the threaded cavity by means of rotation; and
the elastic member is a spring compressed between the positioning component and the linkage component.

9. The inflatable product according to claim 1, wherein:
the built-in air pump assembly further comprises an air replenishing pump disposed in the accommodating chamber.

10. The inflatable product according to claim 9, further comprising:
a central control unit disposed in the accommodating chamber and electrically connected to each of the main air pump, the air replenishing pump, and the air pressure adjustment assembly.

11. The inflatable product according to claim 1, wherein:
the casing further comprises an air port, wherein the accommodating chamber is in fluid communication with the inflatable chamber via the air port; and
the built-in air pump assembly further comprises:
a reversing core axially rotatably disposed in a guide holder, thereby forming an airflow channel;
an air valve corresponding to the air port; and
an air valve actuator abutting against an end of the reversing core, the air valve actuator configured to alternately open and close in response to a rotation of the reversing core.

12. An inflatable product having an inflatable chamber and a built-in air pump assembly, the built-in air pump assembly comprising:
a casing defining an accommodating chamber therein;
an air pressure adjustment assembly comprising:
a housing disposed in the accommodating chamber;
a flexible dividing assembly dividing an interior of the housing into a first chamber on a first side of the flexible dividing assembly and a second chamber on a second side of the flexible dividing assembly, the first chamber being in fluid communication with the inflatable chamber, and the second chamber is in fluid communication with an exterior of the inflatable chamber; and
an adjusting device arranged on the second side of the flexible dividing assembly, the adjusting device comprising:
a positioning component,
a first conductive element comprising a first end fixed to the positioning component, and
an electrically conductive elastic member comprising a first end fixed to the positioning component; and
a driving device configured to adjust a distance between the positioning component and the flexible dividing assembly;
wherein a second end of the first conductive element is alternately disconnected from a second end of the elastic member and in electrical communication with the second end of the elastic member by means of the flexible dividing assembly.

13. The inflatable product according to claim 12, wherein:
when the elastic member is in an uncompressed state, a first distance between the second end of the elastic member and the flexible dividing assembly is smaller than a second distance between the first conductive element and the flexible dividing assembly.

14. An inflatable product comprising:
a built in air pump comprising:

a casing defining an accommodating chamber;
a main air pump disposed in the accommodating chamber; and
an air pressure adjustment assembly comprising:
  a first wire;
  a second wire;
  a housing disposed in the accommodating chamber;
  a flexible board dividing an interior of the housing into a first chamber in fluid communication with the inflatable chamber and a second chamber in fluid communication with an exterior of the inflatable chamber; and
  an adjusting device comprising:
    a positioning component disposed in the second chamber;
    a first conductive element fixed to the positioning element;
    a second conductive element fixed to the flexible board; and
    an electrically conductive elastic member disposed between the positioning component and the flexible board, one end of the elastic member being restrained by the positioning component;
  wherein the first wire of the air pressure adjustment assembly is connected to the first conductive element, the second wire of the air pressure adjustment assembly is connected to the second conductive element, and the first wire is alternatively electrically connected to the second wire in response to the connectivity between the first conductive element and the second conductive element.

15. The inflatable product of claim 14, wherein the adjusting device further comprises a driving device coupled to the positioning component and configured to drive the positioning component to move relative to the housing to thereby adjust the distance between the positioning component and the flexible board.

16. The inflatable product of claim 14, wherein the first conductive element and the elastic member are in contact with the second conductive element or separated from the second conductive element in response to a change in an internal air pressure of the inflatable chamber.

17. The inflatable product of claim 14, wherein, when the elastic member is in an uncompressed state, a first distance between the at least one end of the elastic member and the flexible board is smaller than a second distance between the first conductive element and the flexible board.

18. The inflatable product of claim 1, further comprising a vibration absorbing material wrapped around the main air pump, such that the vibration absorbing material is positioned between the main air pump and the accommodating chamber.

* * * * *